(12) United States Patent
Haimoff et al.

(10) Patent No.: US 9,248,880 B2
(45) Date of Patent: Feb. 2, 2016

(54) FRAME STRUCTURE

(75) Inventors: Efraim Haimoff, Mevaseret Zion (IL); Nir Apelbaum, Tel Aviv (IL)

(73) Assignee: KETER PLASTIC LTD., Herzelyia (IL)

( * ) Notice: Subject to any disclaimer, the term of this patent is extended or adjusted under 35 U.S.C. 154(b) by 573 days.

(21) Appl. No.: 13/496,117

(22) PCT Filed: Sep. 15, 2010

(86) PCT No.: PCT/IL2010/000753
§ 371 (c)(1),
(2), (4) Date: Jun. 7, 2012

(87) PCT Pub. No.: WO2011/033505
PCT Pub. Date: Mar. 24, 2011

(65) Prior Publication Data
US 2012/0242058 A1   Sep. 27, 2012

Related U.S. Application Data

(60) Provisional application No. 61/243,214, filed on Sep. 17, 2009.

(51) Int. Cl.
| | |
|---|---|
| *B62K 3/10* | (2006.01) |
| *B62K 19/10* | (2006.01) |
| *B62K 19/16* | (2006.01) |
| *B62K 3/02* | (2006.01) |

(52) U.S. Cl.
CPC ... *B62K 3/02* (2013.01); *B62K 3/10* (2013.01); *B62K 19/10* (2013.01); *B62K 19/16* (2013.01)

(58) Field of Classification Search
USPC .............. 180/219, 220; 280/274, 281.1, 282, 280/288.3
See application file for complete search history.

(56) References Cited

U.S. PATENT DOCUMENTS

| | | | |
|---|---|---|---|
| 4,613,146 A | 9/1986 | Sharp et al. | |
| 5,193,724 A * | 3/1993 | Robbins | 224/416 |
| 6,691,813 B2 * | 2/2004 | Schless | 180/220 |
| 7,255,191 B2 * | 8/2007 | Baldwin et al. | 180/220 |
| 8,418,795 B2 * | 4/2013 | Sasage et al. | 180/220 |
| 2005/0036849 A1 * | 2/2005 | Kiester et al. | 410/129 |

(Continued)

FOREIGN PATENT DOCUMENTS

| | | |
|---|---|---|
| EP | 0 330 557 A2 | 8/1989 |
| EP | 0 697 333 A1 | 2/1996 |

(Continued)

OTHER PUBLICATIONS

International Search Report for International Application No. PCT/IL2010/000753, mailed Jan. 24, 2011, three pages.

*Primary Examiner* — Joseph Rocca
*Assistant Examiner* — Marc A Scharich
(74) *Attorney, Agent, or Firm* — Vorys, Sater, Seymour and Pease LLP

(57) ABSTRACT

Provided is a frame structure particularly useful for bicycles and the like. In one embodiment, the frame structure includes a top, a bottom, a front end and a rear end, a first frame side element and a second frame side element. The first frame side element and the second frame side element are in juxtaposed spaced relationship via a plurality of frame spacer elements and define an inner space between the first frame side element and the second frame side element, each one of the first frame side element and the second frame side element being in the form of a double walled panel.

13 Claims, 50 Drawing Sheets

(56) References Cited

U.S. PATENT DOCUMENTS

2007/0114753 A1 5/2007 Fritschen
2010/0133030 A1* 6/2010 Johnson et al. .............. 180/68.5
2011/0042916 A1* 2/2011 Ananthakrishna ............ 280/287

FOREIGN PATENT DOCUMENTS

| GB | 1 281 731 | 7/1972 |
| JP | 2-286486 A | 11/1990 |
| WO | 2006/108278 A1 | 10/2006 |

* cited by examiner

FRAME STRUCTURE

This is a National Phase Application filed under 35 U.S.C. §371 as a national stage of PCT/IL2010/000753, filed on Sep. 15, 2010, an application claiming the benefit under 35 U.S.C. §119(e) of U.S. Provisional Application No. 61/243,214, filed on Sep. 17, 2009, the content of each of which is hereby incorporated by reference in their entirety.

FIELD OF THE INVENTION

The present invention relates to frame structures and in particular to injection molded plastic frame structures.

BACKGROUND

Structural frames (also referred to interchangeably herein as frame structures) have many uses. Bicycle frames are conventionally formed from a number of tubular members joined together in a suitable manner, as is well known. Other types of frames, used in bicycles for example, are also known. For example, by way of general background, U.S. Pat. No. 4,613,146 discloses a monocoque bicycle frame having a body defined by right and left side panels, top and bottom panels, and a bifurcated rearward portion defined by such panels and also by a rear wheel well insert. The body panels and insert completely enclose a continuous internal space which is compression loaded or tensile prestressed with a rigid foam plastic for increased torsional rigidity and resistance to impact distortion. The pedal sprocket and chain are both external of the hollow frame so as to not interrupt the continuity of the body cavity and its compression loading.

SUMMARY OF THE INVENTION

According to a first aspect of the invention there is provided a frame structure comprising a top, a bottom, a front end and a rear end, a first frame side element and a second frame side element, wherein said first frame side element and said second frame side element are in juxtaposed spaced relationship via a plurality of frame spacer elements and defining an inner space between said first frame side element and second frame side element, each one of said first frame side element and second frame side element being in the form of a double walled panel.

The frame structure according to the first aspect of the invention may include one or more of the following features (A) to (WW), in any desired combination:

(A) The frame structure, wherein each said double-walled panel comprises pair of spaced panel walls and a plurality of panel webs internally joining the respective panel walls.

(B) The frame structure, including feature (A), wherein for each said double-walled panel the respective said panel webs are in spaced parallel relationship with respect to one another.

(C) The frame structure, including any one of or any desired combination of features (A) to (B), wherein for each said double-walled panel the respective said panel webs are formed as substantially flat strips for at least a portion of said respective double-walled panel.

(D) The frame structure, including any one of or any desired combination of features (A) to (C), wherein for each said double-walled panel the respective said panel webs are formed as substantially flat strips for at least a majority of the longitudinal portion of said respective double-walled panel.

(E) The frame structure, including any one of or any desired combination of features (A) to (D), wherein said panel webs are generally aligned with a forward-aft direction of the frame structure.

(F) The frame structure, optionally including any one of or any desired combination of features (A) to (E), the frame structure comprising a forward portion joined to an aft portion at a transition station, and wherein each one of said first frame side element and said second frame side element comprises a respective forward panel portion joined to a respective aft panel portion at said transition station.

(G) The frame structure, including feature (F), wherein for each one of said first frame side element and said second frame side element, the respective said forward panel portion comprises a first plurality of said panel webs aligned in a first direction, and the respective aft panel portion comprises a second plurality of said panel webs aligned in a second direction different from said first direction.

(H) The frame structure, including feature (G), wherein the respective said forward panel portion of said first frame side element is joined to the respective said forward panel portion of said second frame side element along at least a major part thereof in said first direction via a first set of said frame spacer elements, and wherein said aft panel portion of said first frame side element is separated from said aft panel portion of said second frame side element along at least a major part thereof in said second direction from said aft end by an aft space.

(I) The frame structure, including feature (H), wherein said aft panel portion of said first frame side element is joined to said aft panel portion of said second frame side element along a part thereof in proximity to said transition station via a second set of said spacer elements.

(J) The frame structure, including any one of or any desired combination of features (I) to (I), wherein said spacer elements of said first set of spacer elements are in the form of first spacer webs joined to the inner space-facing panel walls of the respective said forward panel portions of said first and second frame side elements.

(K) The frame structure, including feature (J), wherein at least one of said first spacer webs is aligned in a third direction, different from said first direction and said second direction.

(L) The frame structure, including any one of or any desired combination of features (J) and (K), wherein at least one of said first spacer webs is substantially orthogonal to said first direction.

(M) The frame structure, including any one of or any desired combination of features (I) to (L), wherein at least one of said first spacer webs is substantially aligned with said first direction.

(N) The frame structure, including any one of or any desired combination of features (J) to (M), wherein said spacer elements of said second set of spacer elements are in the form of second spacer webs joined to a respective inner space-facing panel wall of the respective said aft panel portions of said first and second frame side elements, wherein at least one of said second spacer webs is substantially aligned with said second direction.

(O) The frame structure, including any one of or any desired combination of features (G) to (N), wherein said first direction is defined on a first plane and said second direction is defined on a second plane, wherein said first plane is substantially parallel to said second plane.

(P) The frame structure, including any one of or any desired combination of features (G) to (N), wherein said first direction is defined on a first plane and said second direction is defined on a second plane, wherein said first plane diverges with respect to said second plane.

(Q) The frame structure, optionally including any one of or any desired combination of features (A) to (P), configured for use as a bicycle frame, the frame structure further comprising a first mounting structure configured for enabling rotatably mounting a bicycle steering structure to said front end, and a second mounting structure configured for enabling mounting of a bicycle seating structure thereto.

(R) The frame structure, including feature (Q), wherein said first mounting structure is provided in said inner space and comprises a pair of spaced bearings mounted in a first well comprised in said inner space, said bearings being configured for enabling a pivot shaft of the bicycle steering structure to be rotatably mounted thereto for selectively pivoting the bicycle steering structure with respect to said frame structure.

(S) The frame structure, including feature (R), wherein said first well comprises a pair of spaced first well webs formed in said inner space and joined to the inner space-facing panel walls of the respective said forward panel portions of said first and second frame side elements.

(T) The frame structure, including feature (S), wherein said first well webs are parallel and aligned in a fourth direction, different from said first direction and said second direction.

(U) The frame structure, including any one of or any desired combination of features (R) and (S), said first well webs are parallel and aligned in a direction substantially orthogonal to said first direction.

(V) The frame structure, including any one of or any desired combination of features (Q) to (U), wherein said second mounting structure is provided in said inner space and comprises a second well comprised in said inner space, said second well being configured for enabling a seat post of the bicycle seating structure to be mounted thereto.

(W) The frame structure, including feature (V), wherein said second well comprises a pair of spaced second well webs formed in said inner space and joined to the inner space-facing panel walls of the respective said double-walled panels of said first and second frame side elements.

(X) The frame structure, including feature (W), wherein said second well webs are parallel and aligned in a fifth direction, different from said first direction and said second direction.

(Y) The frame structure, including any one of or any desired combination of features (V) and (W), said second well webs are parallel and aligned in a direction substantially orthogonal to said first direction.

(Z) The frame structure, including any one of or any desired combination of features (Q) to (Y), further comprising a pedal sprocket is mounted for rotation in said frame structure, and wherein said pedal sprocket is accommodated in said inner space.

(AA) The frame structure, including any one of or any desired combination of features (Q) to (Y), further comprising a pedal sprocket mounted for rotation in said frame structure, and wherein said pedal sprocket is accommodated within a sprocket chamber in one or another of said double-walled panels.

(BB) The frame structure, including feature (AA), further comprising pedals connected to said pedal sprocket.

(CC) The frame structure, including any one of or any desired combination of features (AA) to (BB), wherein at least the respective said double-walled panel in which said pedal sprocket is enclosed comprises at least one opening providing communication between said sprocket chamber and said aft space.

(DD) The frame structure, including feature (CC), wherein said aft space defines a rear wheel well therebetween, and wherein said aft panel portion of said first frame side element and said aft panel portion of said second frame side element each comprise a rear wheel mounting arrangement.

(EE) The frame structure, including feature (DD), wherein the frame structure comprises a rear wheel rotatably mounted to said rear wheel mounting arrangement.

(FF) The frame structure, including feature (EE), wherein said rear wheel comprises a wheel sprocket located in said aft space, and further comprises a drive belt configured for rotatably connecting said pedal sprocket to said wheel sprocket via said at least one opening.

(GG) The frame structure, including any one of or any desired combination of features (Q) to (FF), further comprising a bicycle steering structure rotatably mounted to said front end, said bicycle steering structure comprising a pivot shaft, front wheel and handlebars.

(HH) The frame structure, optionally including any one of or any desired combination of features (A) to (GG), wherein part of said inner space is configured as at least one compartment.

(II) The frame structure, including feature (HH), wherein at least one said compartment is configured for accommodating desired items, accessible via said top.

(JJ) The frame structure, including feature (HH) or feature (II), wherein at least one said compartment is configured for accommodating a battery, and suitable controls, accessible from an outside of the frame structure, for providing electrical power to the frame structure.

(KK) The frame structure, including feature (JJ), further comprising at least one electrical light source operatively connected to said battery and controls, wherein said controls are configured for enabling selective operation of the at least one electrical light source.

(LL) The frame structure, including feature (JJ) or feature (KK), further comprising an electrical interface operatively connected to said battery.

(MM) The frame structure, including feature (LL), wherein said interface is configured for enabling said battery to be connected to an external power source for recharging said battery when connected thereto.

(NN) The frame structure, including feature (LL) or feature (MM), wherein said interface is configured for enabling said battery to be connected to external electrical or electronic equipment for providing power thereto when said battery is connected thereto.

(OO) The frame structure, including any one of or any desired combination of features (JJ) to (NN), further comprising an electrical recharger operatively connected to said battery.

(PP) The frame structure, including feature (OO), wherein said electrical recharger comprises a dynamo.

(QQ) The frame structure, optionally including any one of or any desired combination of features (A) to (PP), wherein the frame structure is manufactured as an integrally formed unitary item.

(RR) The frame structure, including feature (QQ), wherein frame structure is formed as an injection molded, single-piece unitary item.
(SS) The frame structure, including any one of or any desired combination of features (QQ) to (RR), wherein at least said first frame side element, said second frame side element and said frame spacer elements are manufactured as an integrally formed unitary item.
(TT) The frame structure, optionally including any one of or any desired combination of features (A) to (SS), wherein each one of said first frame side element and said second frame side element is manufactured separately as an integrally formed unitary item, and joined together via said frame spacer elements.
(UU) The frame structure, including feature (TT), wherein each one of said first frame side element and said second frame side element is formed as an injection molded, single-piece unitary item.
(VV) The frame structure, optionally including any one of or any desired combination of features (A) to (UU), wherein each one of said first frame side element and said second frame side element is manufactured separately from a number of separately formed elements subsequently joined together to form the respective said double-walled panels, which are joined together via said frame spacer elements.
(WW) The frame structure, optionally including any one of or any desired combination of features (A) to (VV), wherein at least said first frame side element, said second frame side element and said frame spacer elements are made from a plastic material.

According to a second aspect of the invention, there is provided a frame structure comprising a first frame side element and a second frame side element fixedly secured in a juxtaposed however spaced apart relation by a plurality of support spacers, each of said first frame and second frame being double walled.

Optionally, the frame structure according to the second aspect of the invention may comprise any one of or any desired combination of features (A) to (WW) of the first aspect of the invention, mutatis mutandis. Additionally or alternatively, the frame structure according to the second aspect of the invention may include one or more of the following features (a) to (m), in any desired combination:
(a) Wherein the first frame side element and said second frame side element are each manufactured by plastic core-injection molding.
(b) Wherein the first frame side element and the second frame side element are separately manufactured and are then articulated to one another.
(c) Wherein the frame structure is manufactured as a unitary, integrated frame manufactured by single plastic core-injection molding technology, or by a combination of technologies, i.e. within the molding machine cycle time or after de-molding of the part.
(d) Wherein the frame structure is manufactured by injecting sub-parts (i.e. the first frame and second frame) and fixedly assembling them together e.g. by ultrasonic welding, laser welding, heat welding, injected seam, etc., so as to form a solid frame structure composed of the first frame and second frame, however where each wall thereof is separately manufactured and than integrated into the final structure.
(e) Wherein the first frame side element and said second frame side element may be reinforced by a plurality of reinforcing longitudinal ribs and optionally by the provision of structural reinforcing elements which in turn may be incorporated during the injection process.
(f) Wherein the frame structure is a bicycle structure, such that at least the bicycle's fork, saddle support, transmission and rear wheel extend between and are supported by the first frame and second frame.
(g) Wherein first frame side element and said second frame side element may extend parallel to one another, or have parallel sections, or extend at angled relation with respect to one another
(h) Wherein the first frame side element and said second frame side element may be symmetric.
(i) Wherein the first frame side element and said second frame side element may be secured to one another, e.g. by heat welding, ultra some welding, laser welding, mechanical securing elements (e.g. bolts, rivets, fasteners, etc.).
(j) Wherein optional additional parts of the frame structure can be secured to each other and to the first frame side element and/or said second frame side element in various possible ways, as would be appreciated by those of average skill in the art.
(k) Wherein the first frame side element and said second frame side element may be integrally formed with the support spacers inwardly projecting into the space between the two frames, such that said support spacers serve for securing the frames to one another and for supporting components of the structure composed of said frame structure.
(l) The frame structure and various components thereof can optionally further include various interfaces, for example, a battery interface, a control panel interface, etc. The batteries, sensors and/or controllers controlled from the control panel interface, etc., can be housed in the frame and/or some of its components. The above enables uses, such as for example, battery recharging for a cellular phone, a music player, etc. The control panel can display and allow control of sensory data acquired from sensors disposed on the bicycle or attached thereto, such as temperature, speed, velocity, wheel rpm, etc.
(m) The frame and various components thereof can be formed with storage compartments, head or tail lights, a compass at a top side or panel of the frame, etc.

According to a third aspect of the invention, there is provided a frame structure configured for supporting therein at least a bicycle steering structure and a bicycle seating structure, the frame structure comprising at least a first channel set comprising a plurality of internal elongate rectilinear first channels parallel to a first direction Optionally, the frame structure according to the third aspect of the invention may comprise any one of or any desired combination of features (A) to (WW) of the first aspect of the invention, mutatis mutandis. Additionally or alternatively, the frame structure according to the third aspect of the invention may comprise any one of or any desired combination of features (a) to (m) of the second aspect of the invention, mutatis mutandis. Additionally or alternatively, the frame structure according to the third aspect of the invention may include one or more of the following features, in any desired combination:

The frame structure further comprising at least a second channel set comprising a plurality of internal elongate rectilinear second channels parallel to a second direction.

The frame structure further comprising at least a third channel set comprising a plurality of internal elongate rectilinear third channels parallel to a third direction.

The frame structure further wherein said first direction, said second direction and third direction are non-parallel with respect to one another.

BRIEF DESCRIPTION OF THE DRAWINGS

In order to understand the disclosed subject matter and to see how it may be carried out in practice, an example will now be described, by way of a non-limiting example only, with reference to the accompanying drawings, in which.

BRIEF DESCRIPTION OF SPECIFIC EMBODIMENTS

Figure 1:
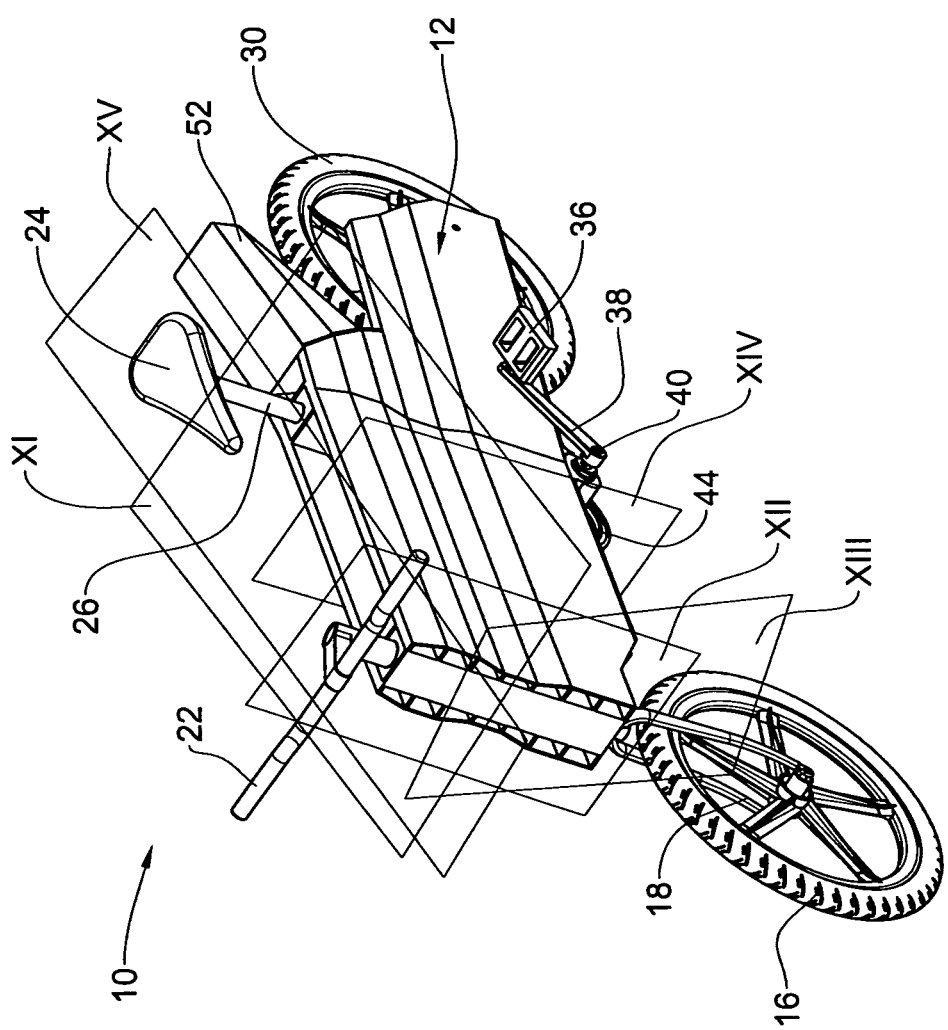
FIG. 1 is a front perspective view of a bicycle fitted with a frame structure in accordance with the disclosed subject matter.
Figure 2:
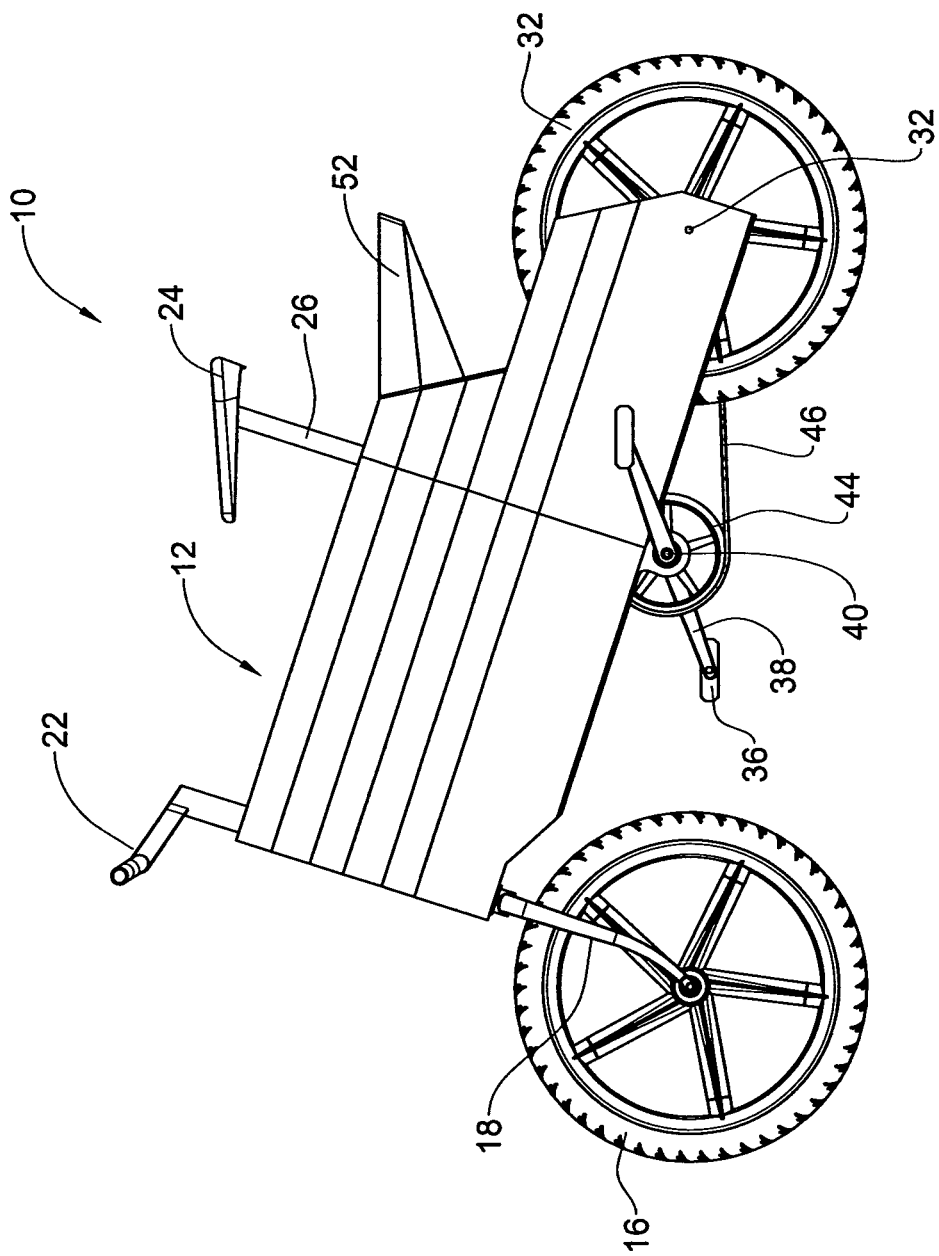
FIG. 2 is a side view of the bicycle illustrated in FIG. 1.
Figure 3:
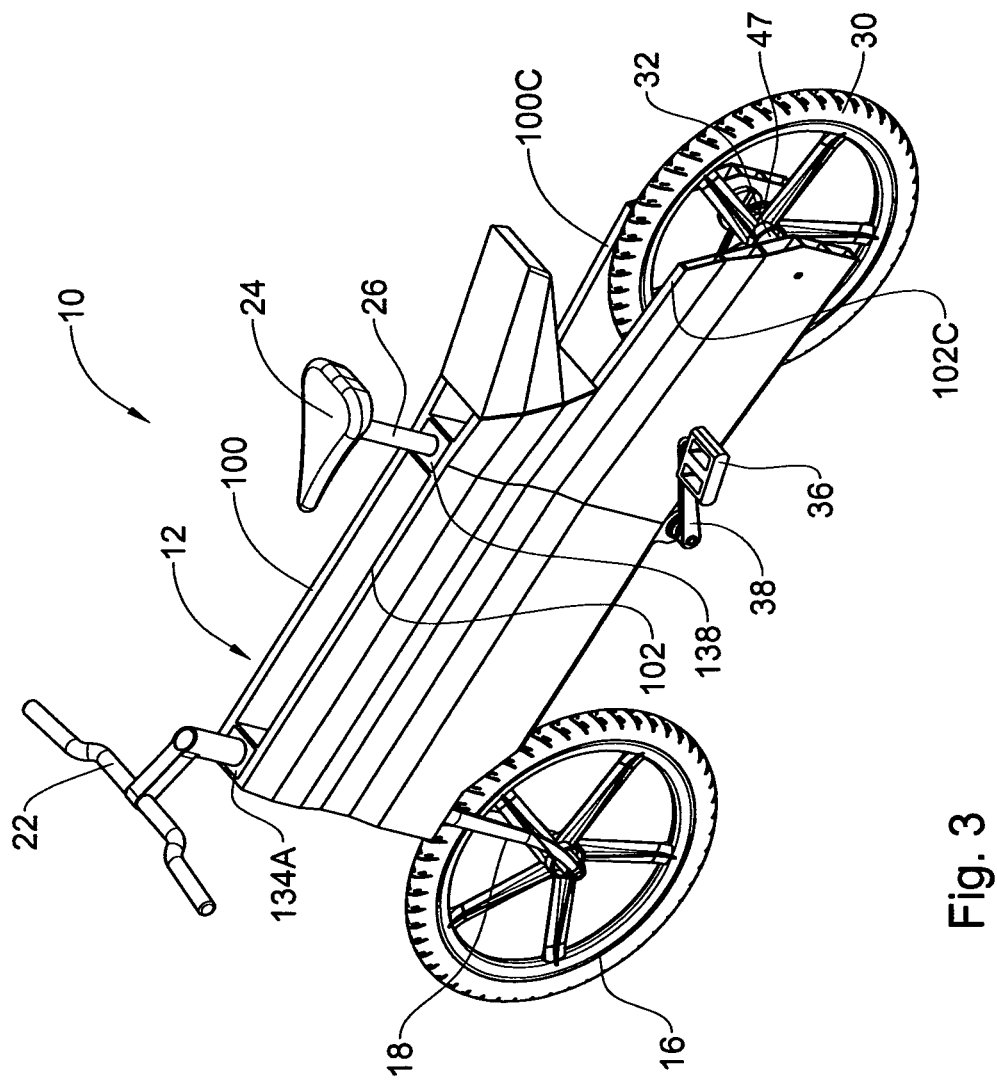
FIG. 3 is a rear perspective view of the bicycle.
Figure 4:
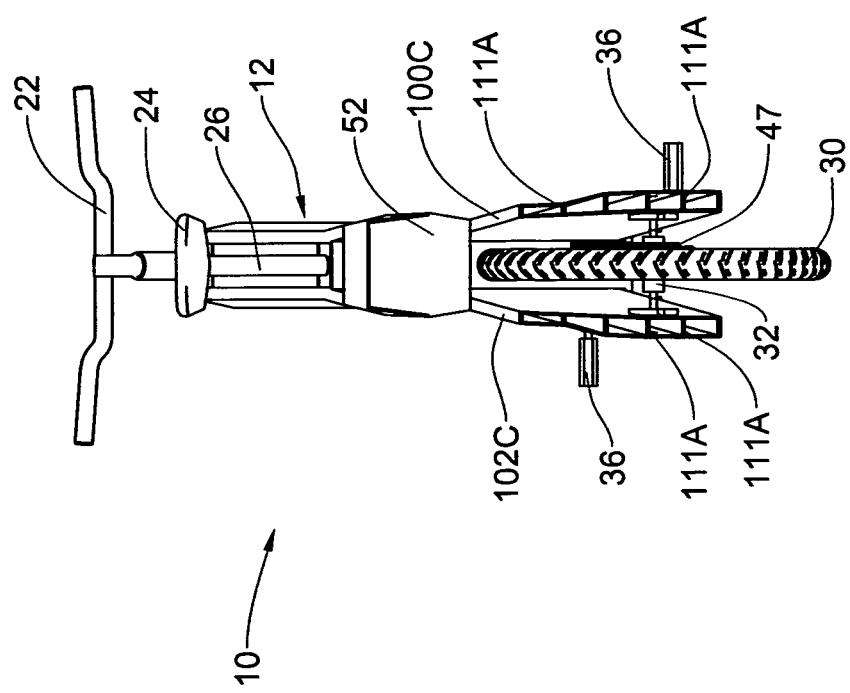
FIG. 4 is a rear view of the bicycle.
Figure 5:
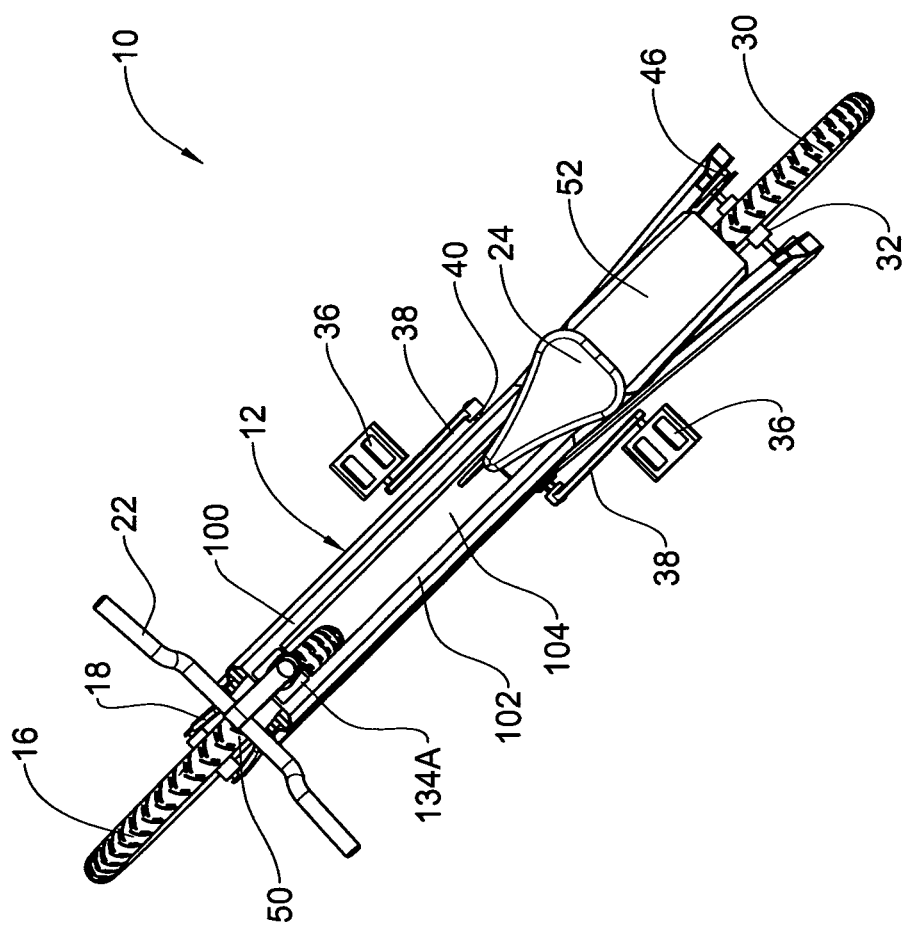
FIG. 5 is a top view of the bicycle.
Figure 6:
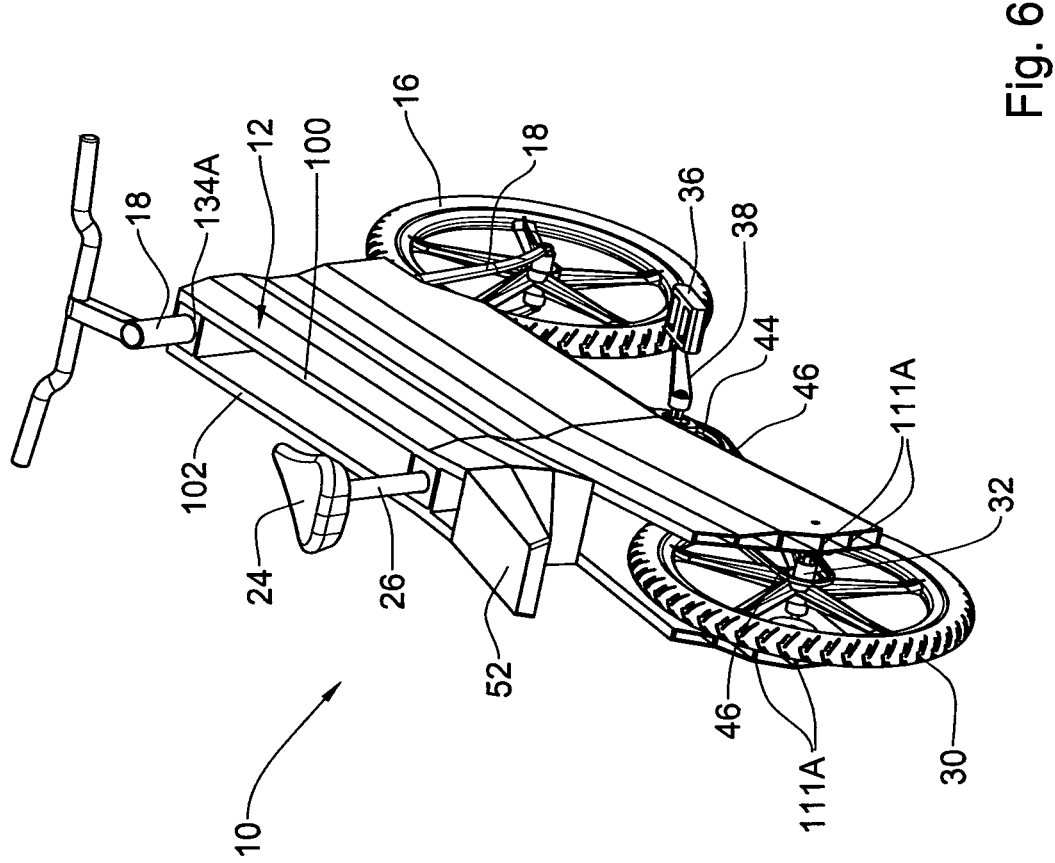
FIG. 6 is a rear right perspective view of the bicycle.
Figure 7:
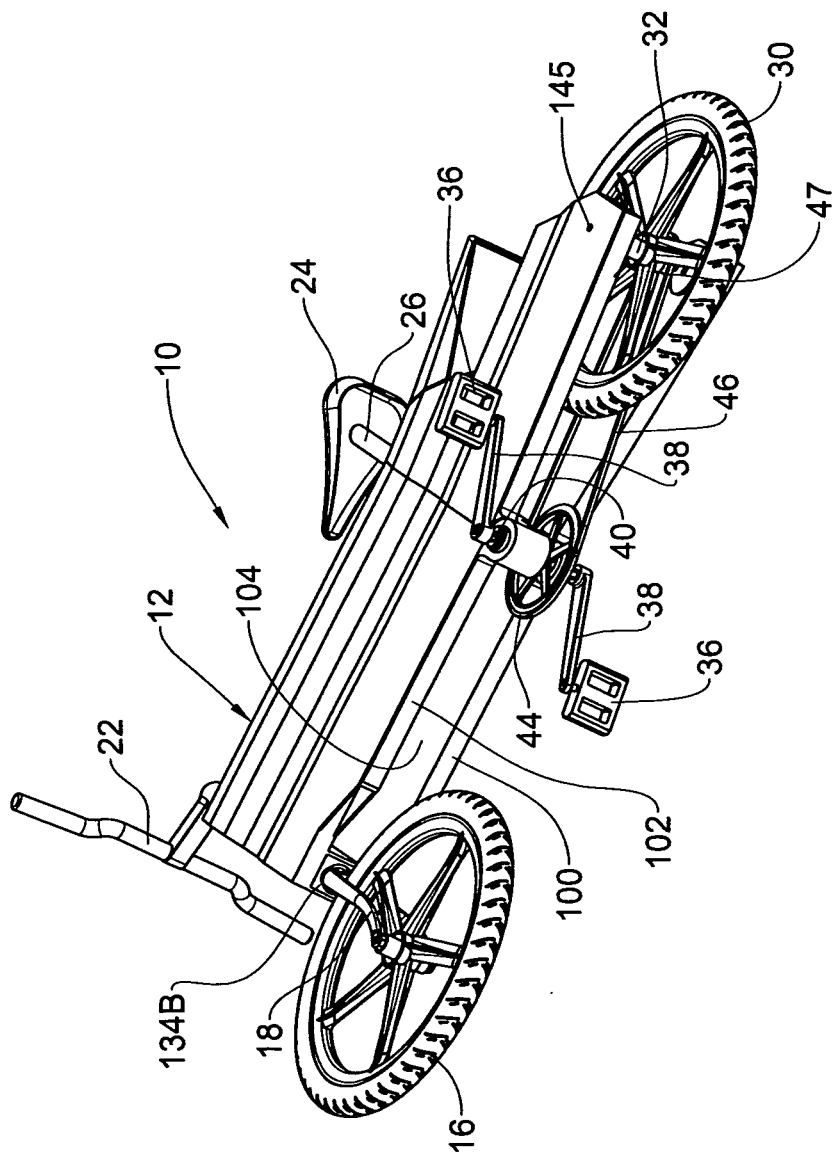
FIG. 7 is a bottom perspective view of the bicycle.
Figure 8:
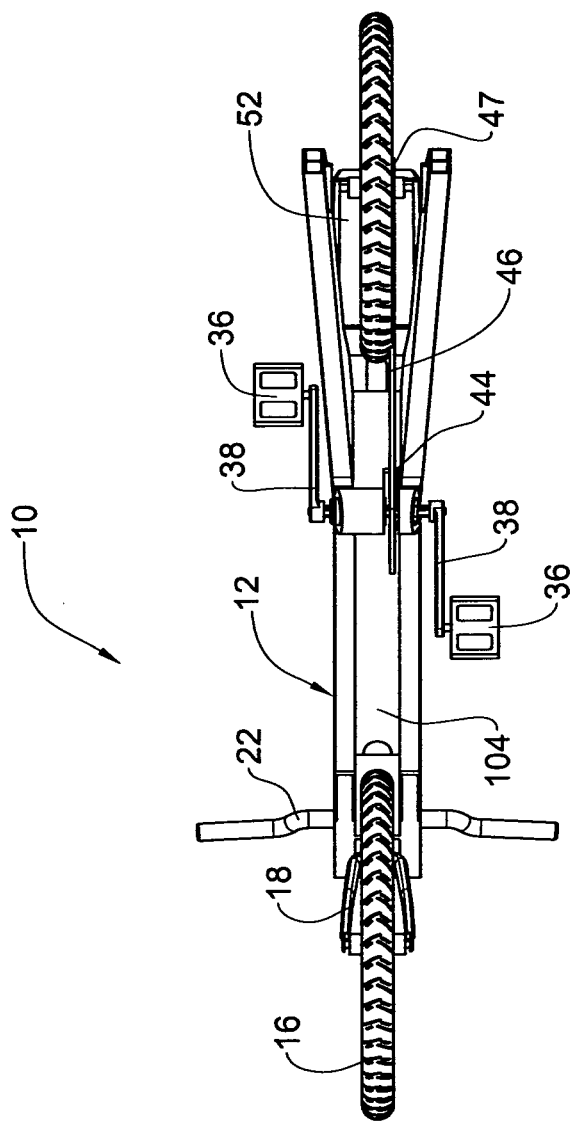
FIG. 8 is a bottom view of the bicycle.
Figure 9:
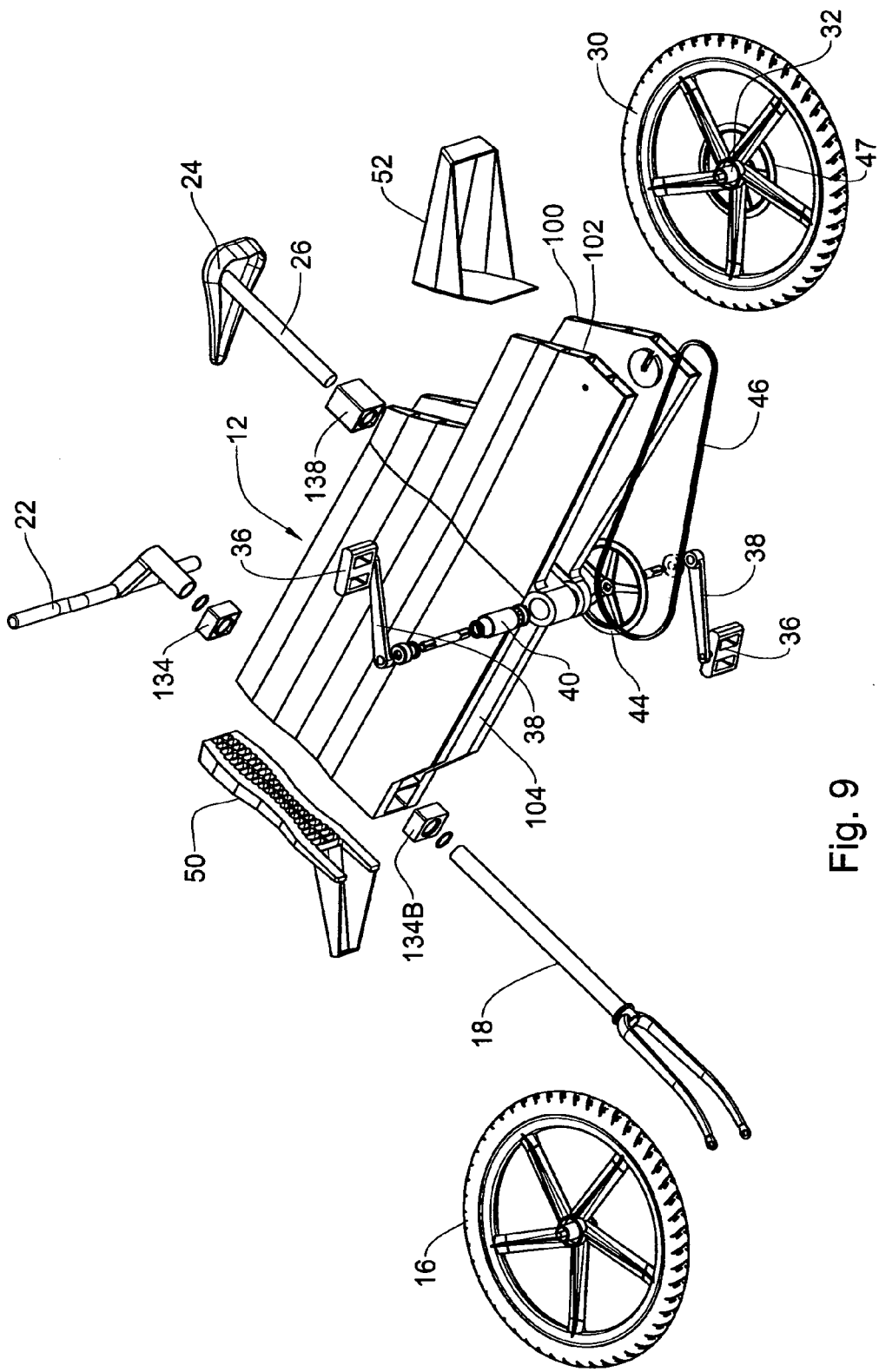
FIG. 9 is an exploded perspective view of the bicycle.
Figure 10:
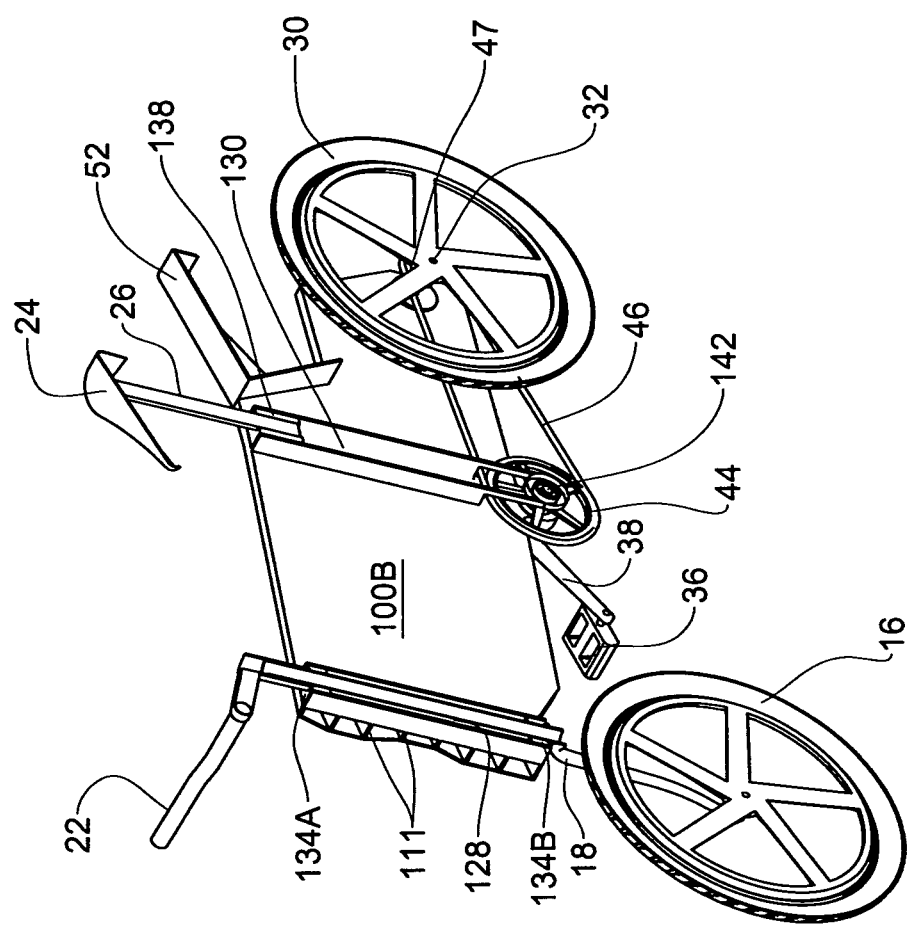
FIG. 10 is a vertical section along the bicycle.
Figure 11:
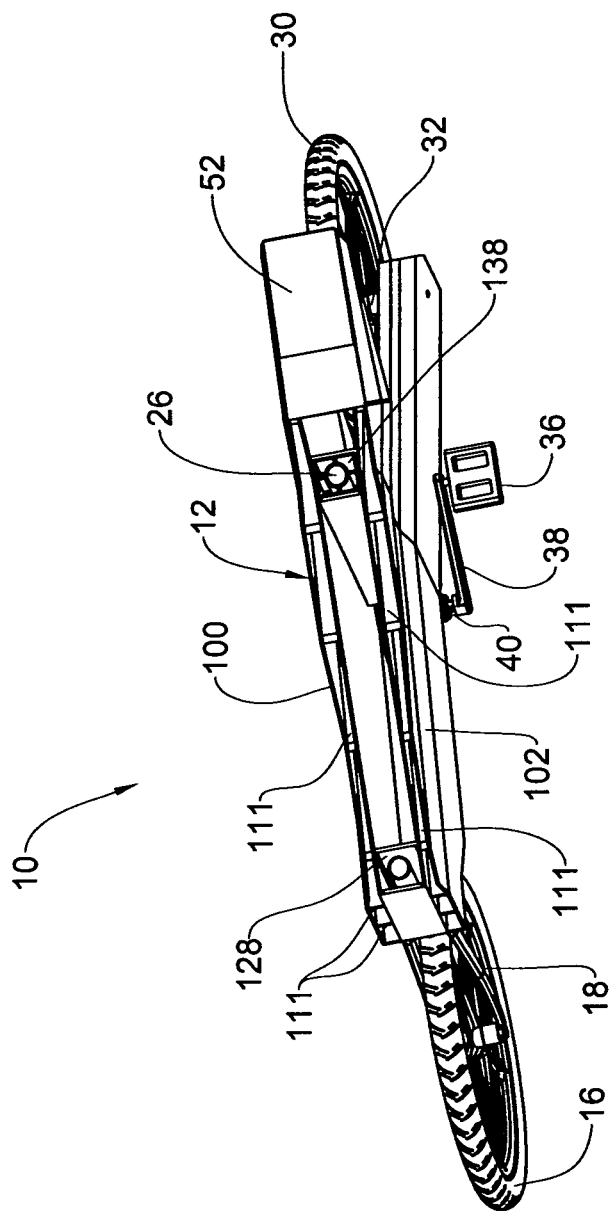
FIG. 11 is a top perspective view of the bicycle sectioned along the plane marked XI in FIG. 1.
Figure 12:
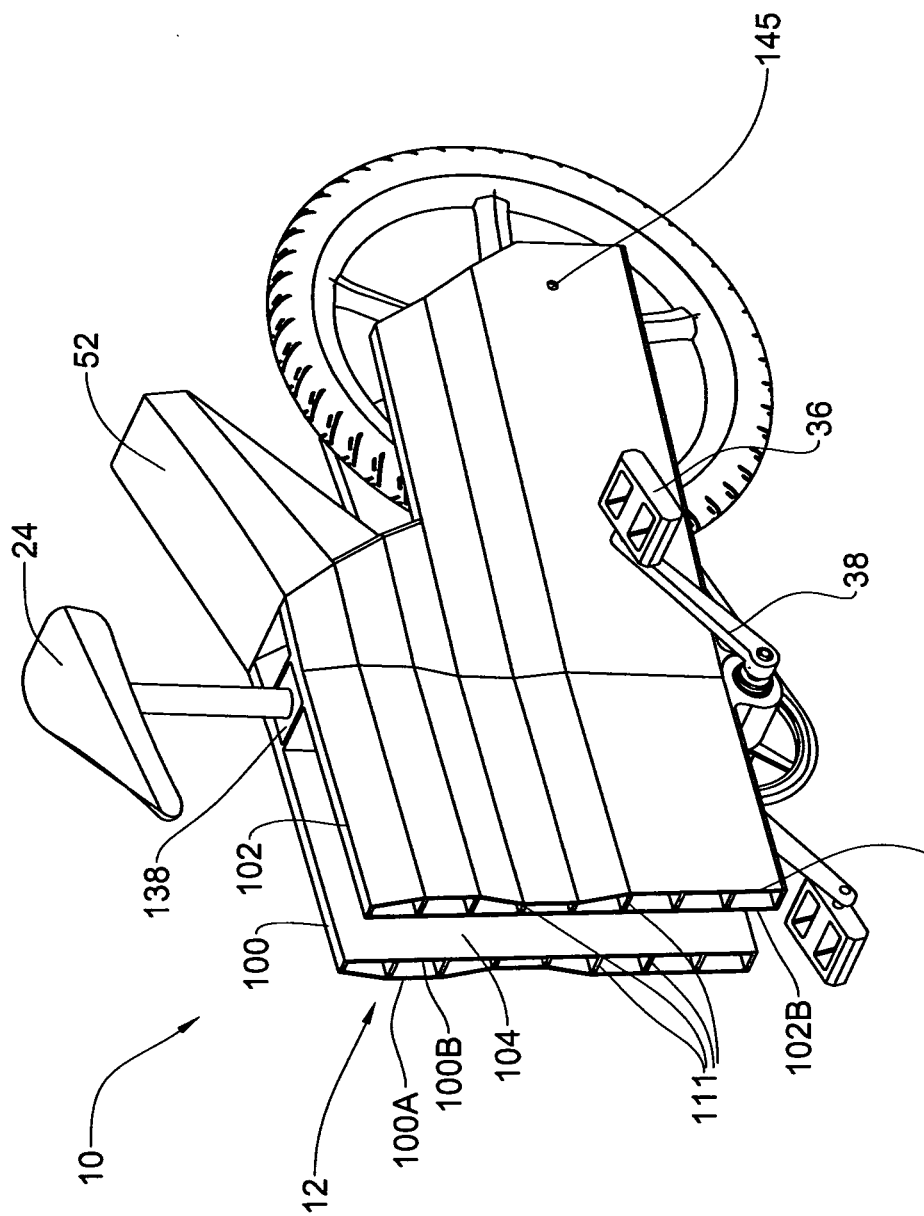
FIG. 12 is a perspective e view of the bicycle sectioned along the plane marked XII in FIG. 1.
Figure 13:
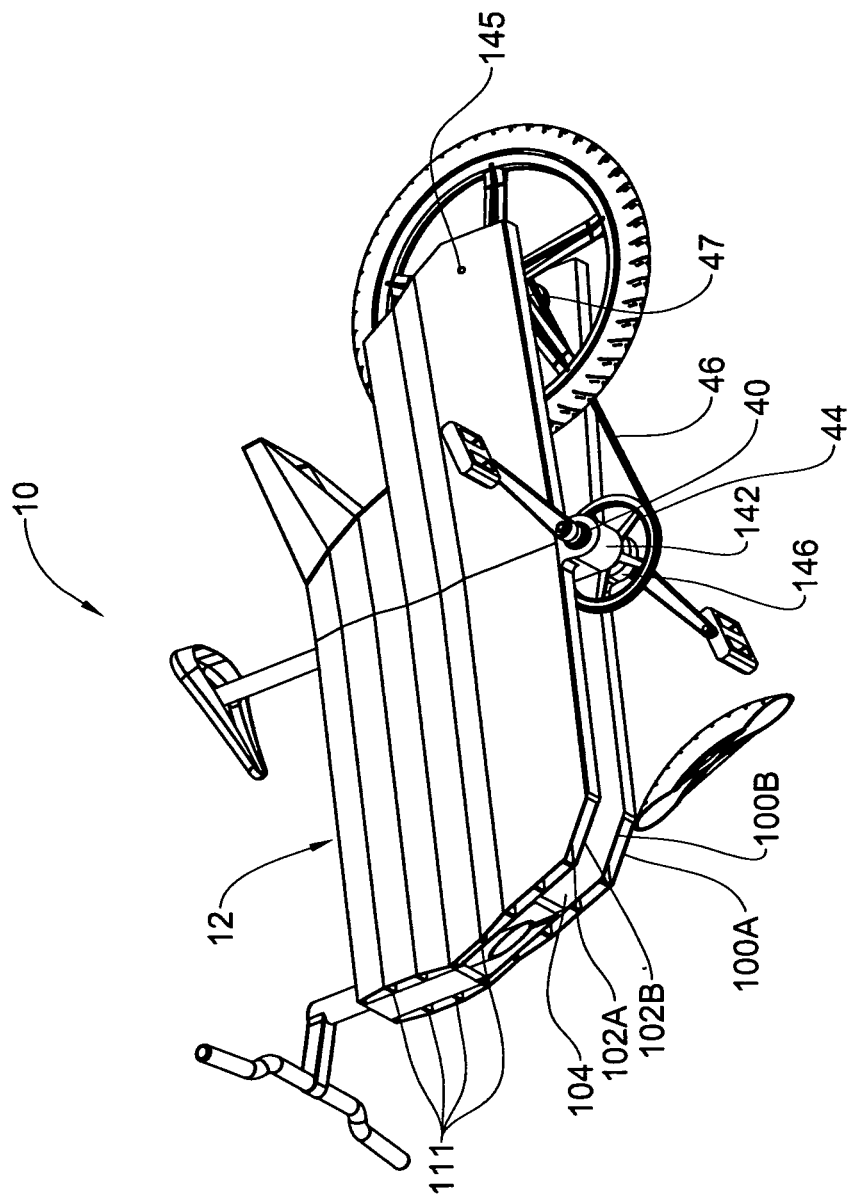
FIG. 13 is a bottom perspective view sectioned along plane marked XIII in FIG. 1.
Figure 14:
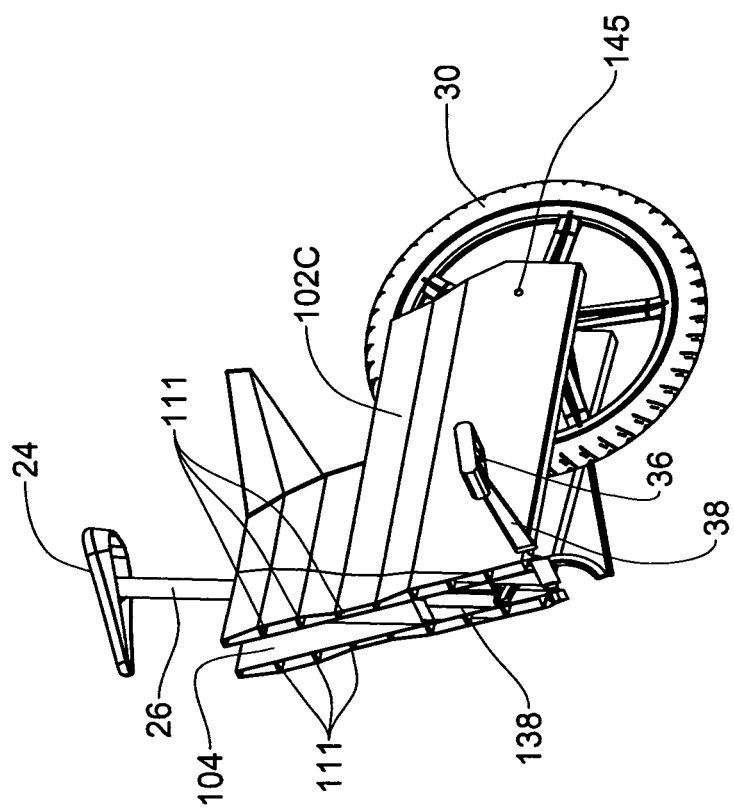
FIG. 14 is a bottom perspective view sectioned along plane XIV in FIG. 1.
Figure 15:
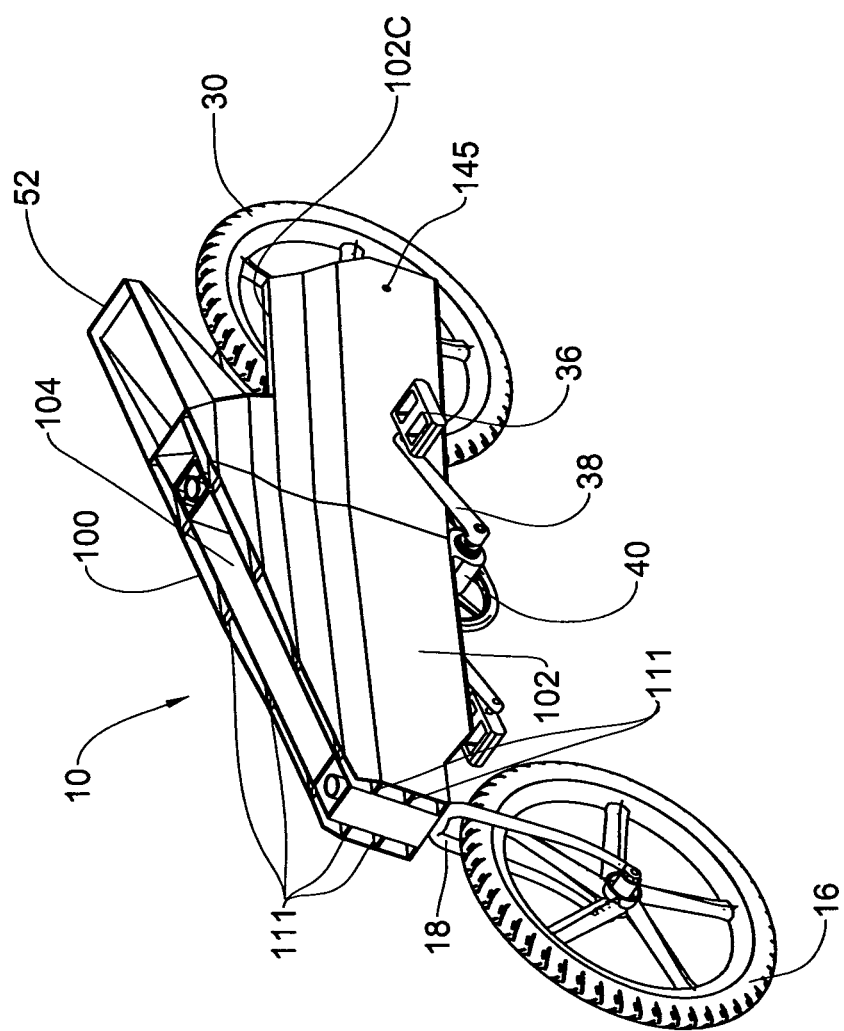
FIG. 15 is a perspective view of the bicycle sections along plane XV in FIG. 1.
Figure 16:
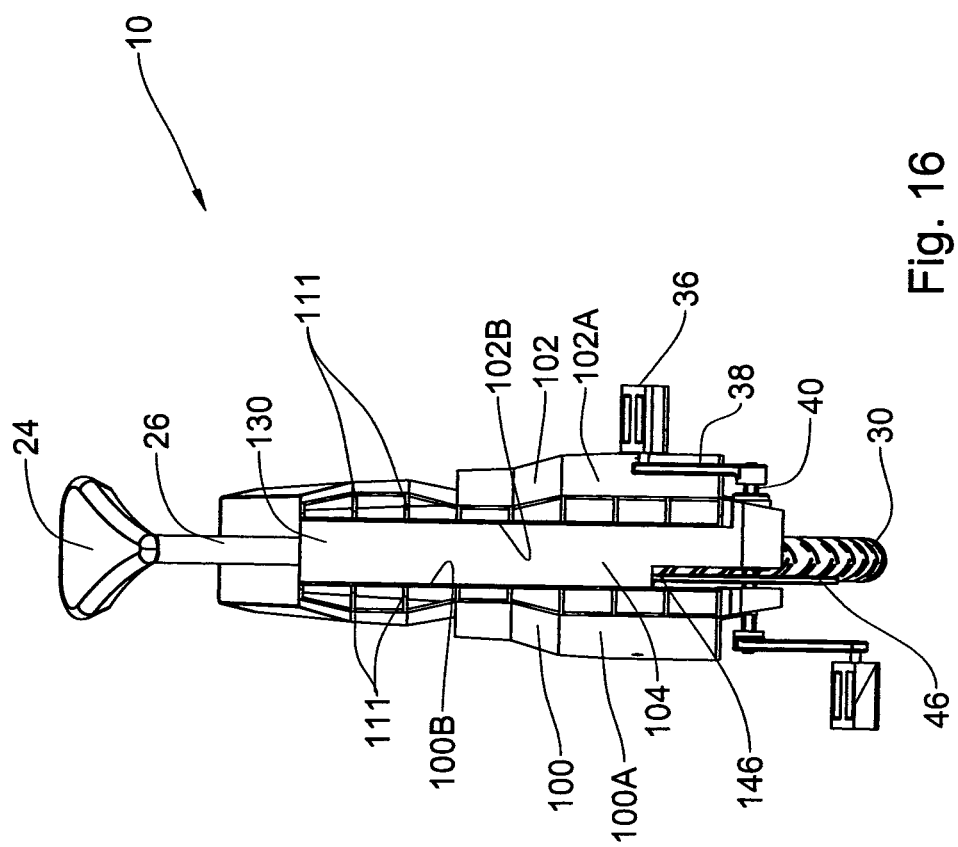
FIG. 16 is front view sectioned along line XIV-XIV in FIG. 1.
Figure 17:
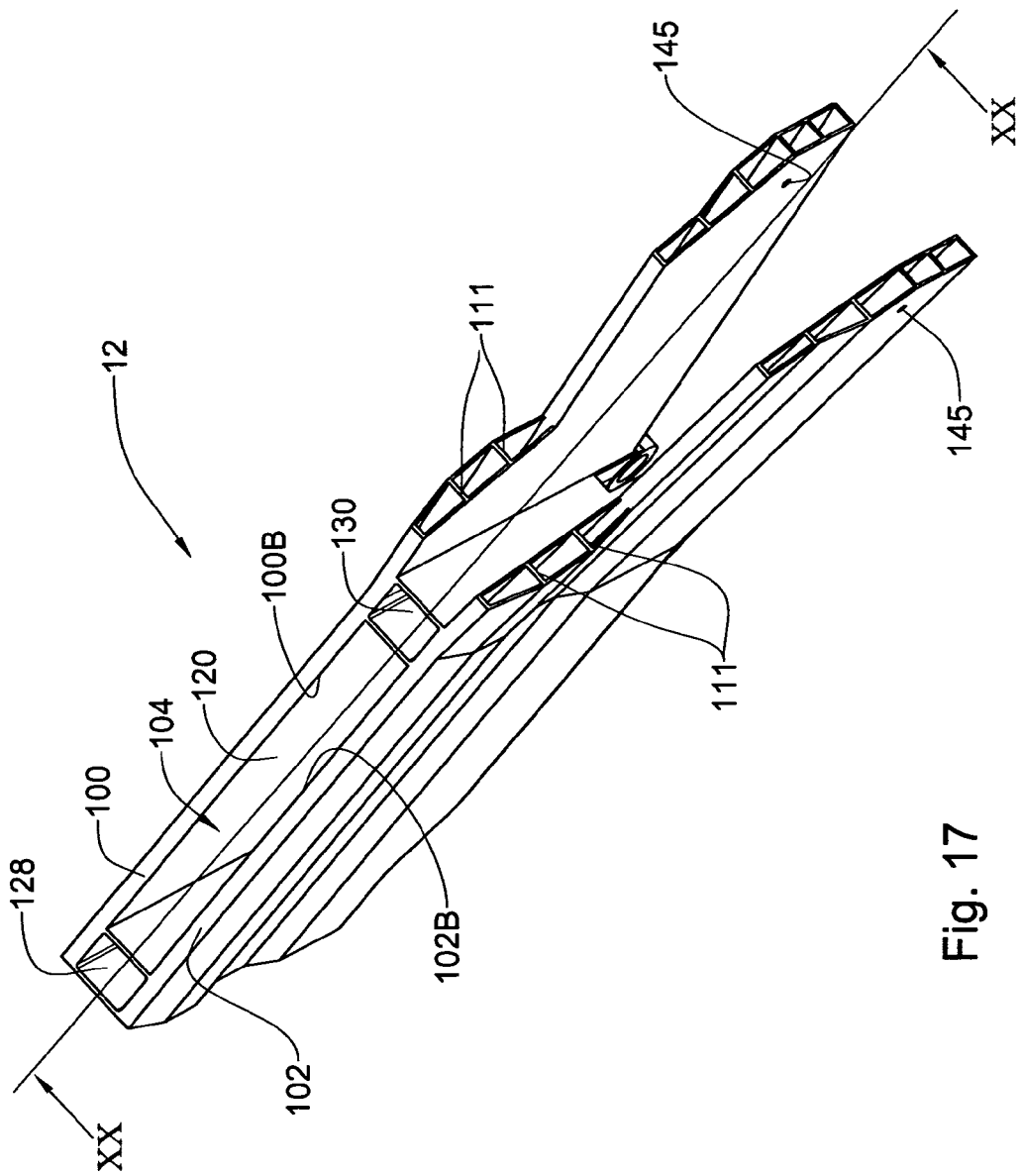
FIG. 17 is a rear, top perspective view of only the bicycle frame of the disclosed subject matter.
Figure 18:
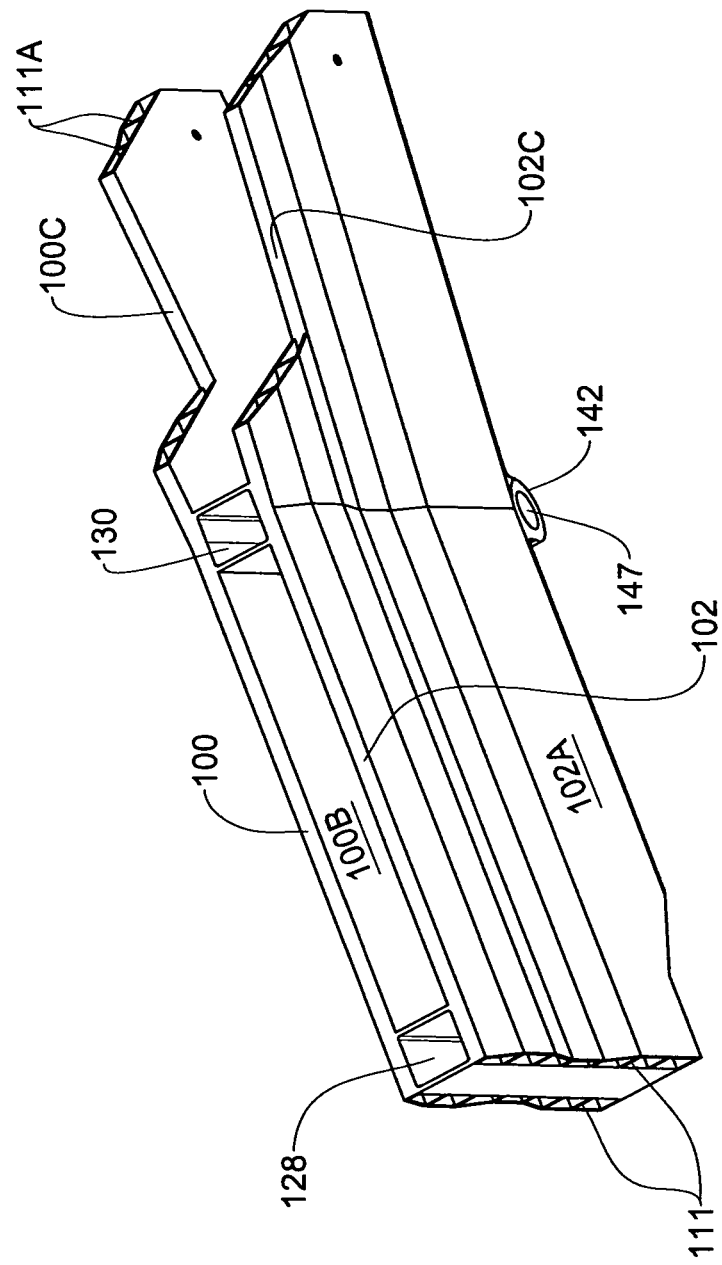
FIG. 18 is a front, top perspective view of the frame of FIG. 17.
Figure 19:
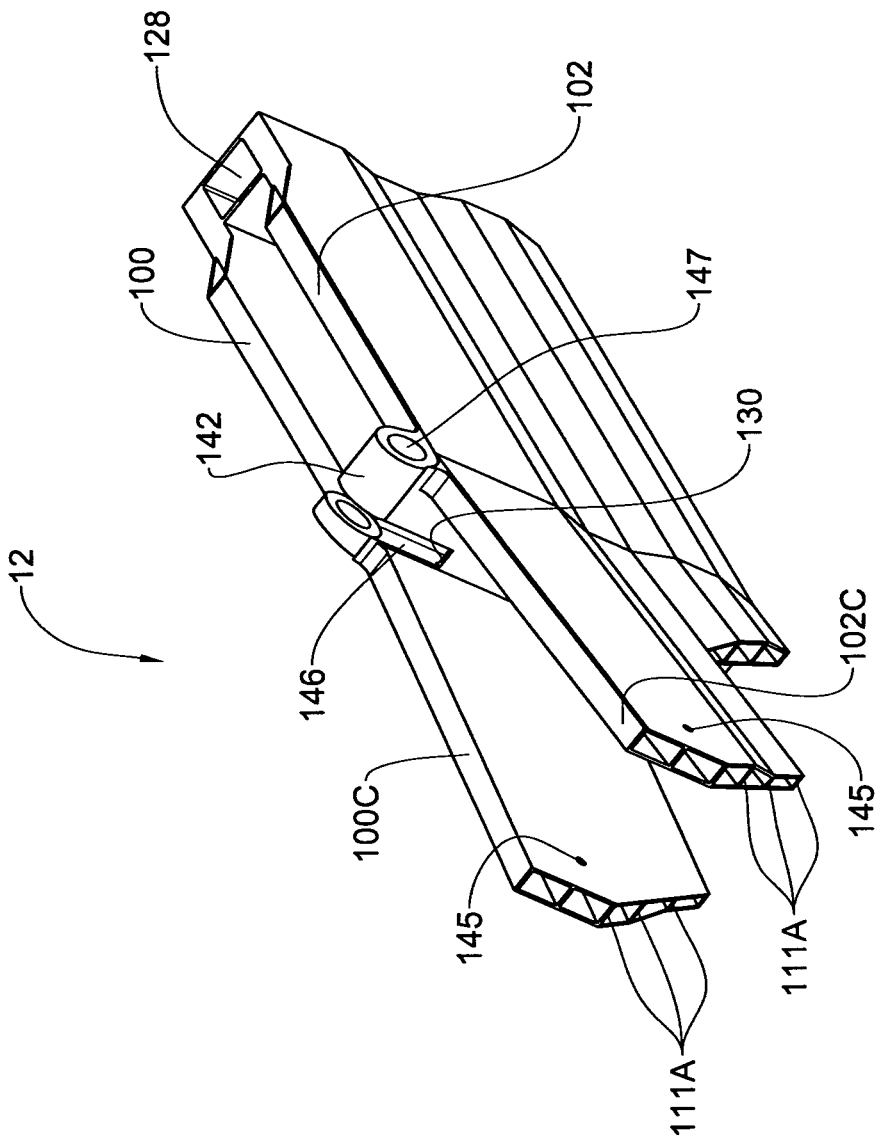
FIG. 19 is a bottom perspective view of the bicycle frame.
Figure 20:
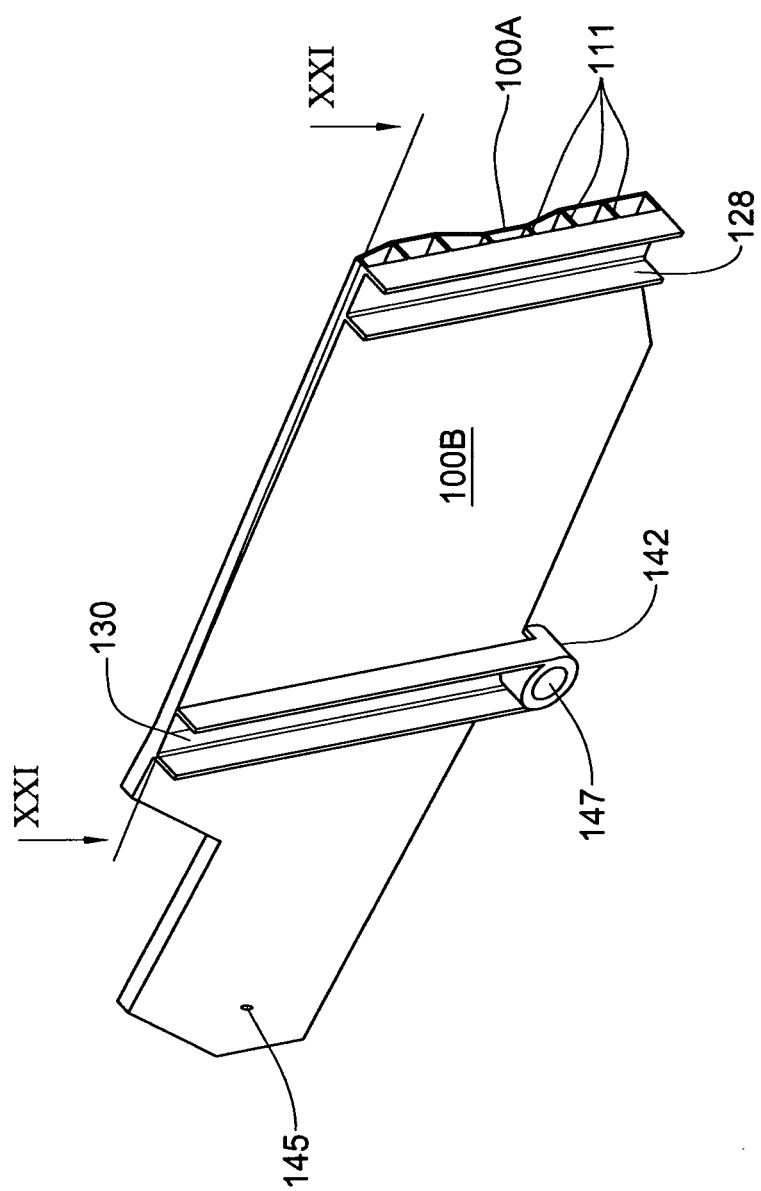
FIG. 20 is a section along line XX-XX in FIG. 17.
Figure 21:
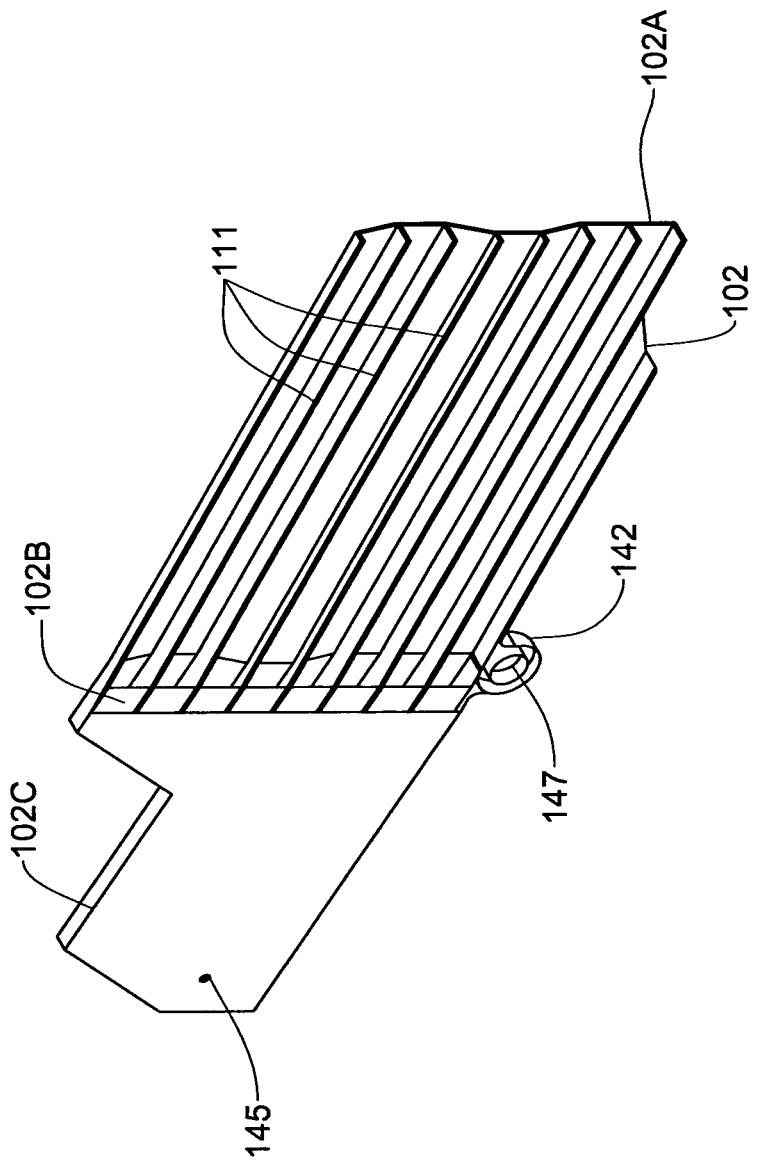
FIG. 21 is a frame element of FIG. XX, sectioned along line XXI-XXI.
Figure 22:
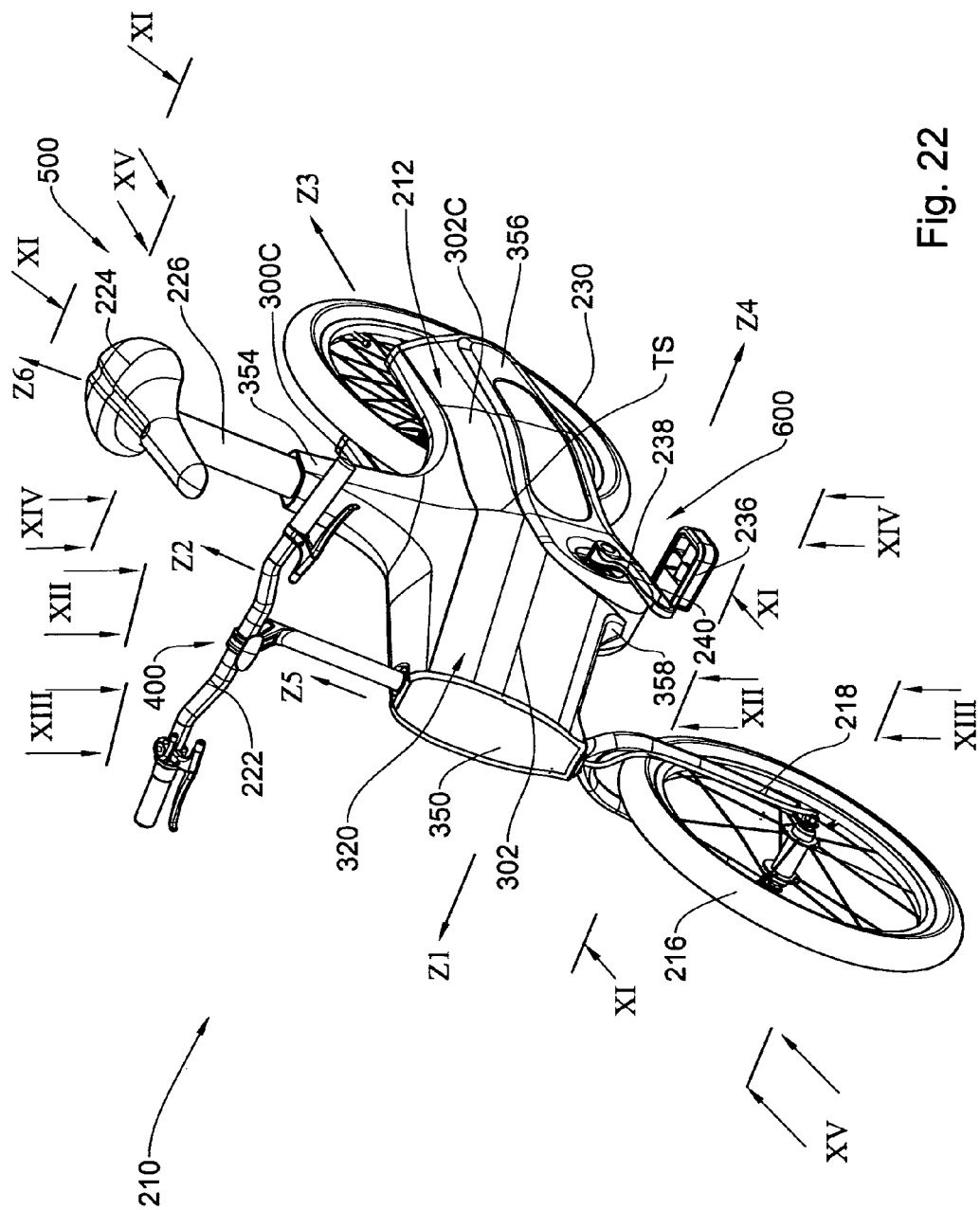
FIG. 22 is a front perspective view of a bicycle fitted with a frame in accordance with another example of the disclosed subject matter.
Figure 23:
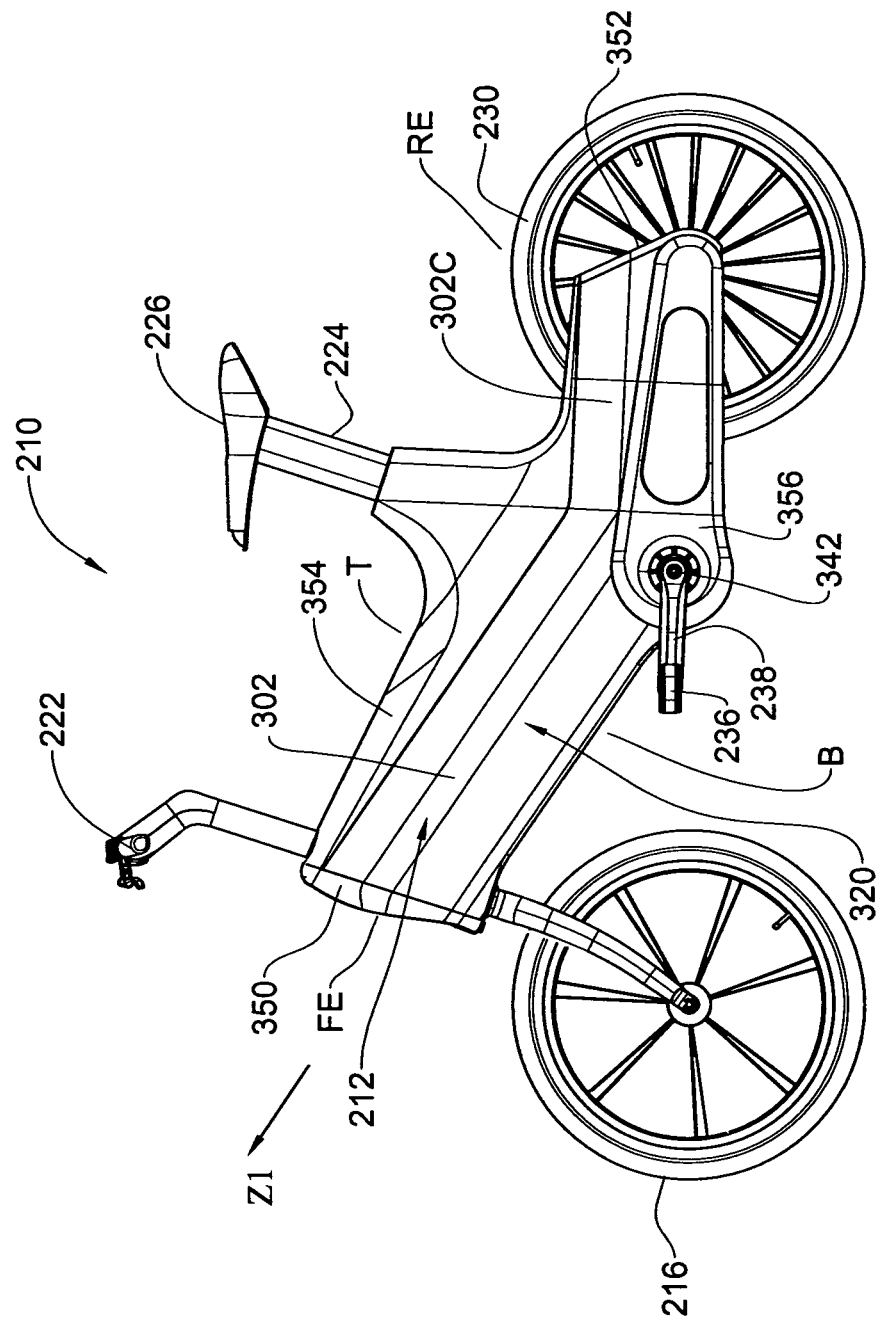
FIG. 23 is a side view of the bicycle illustrated in FIG. 22.
Figure 24:
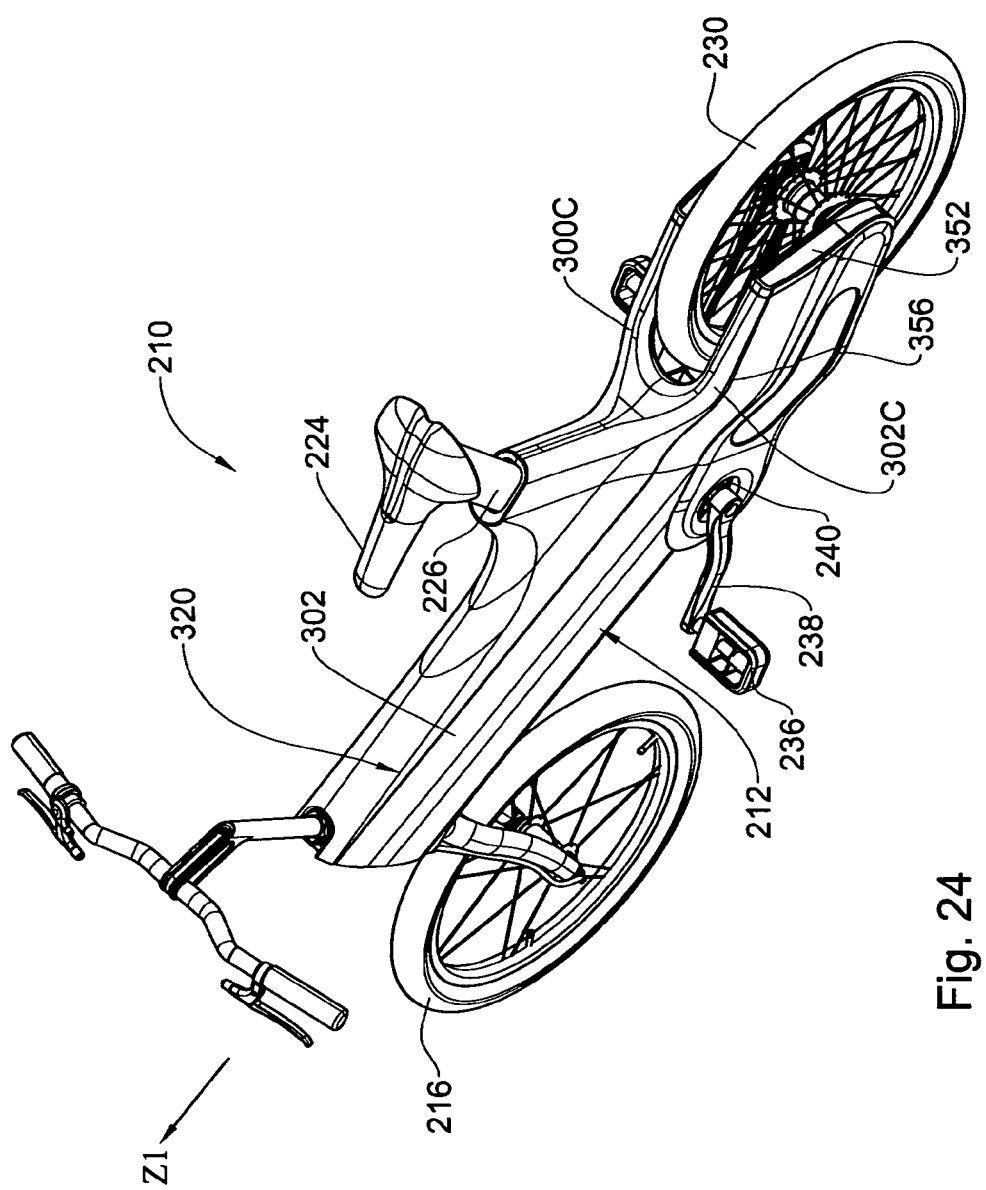
FIG. 24 is a rear perspective view of the bicycle.
Figure 25:
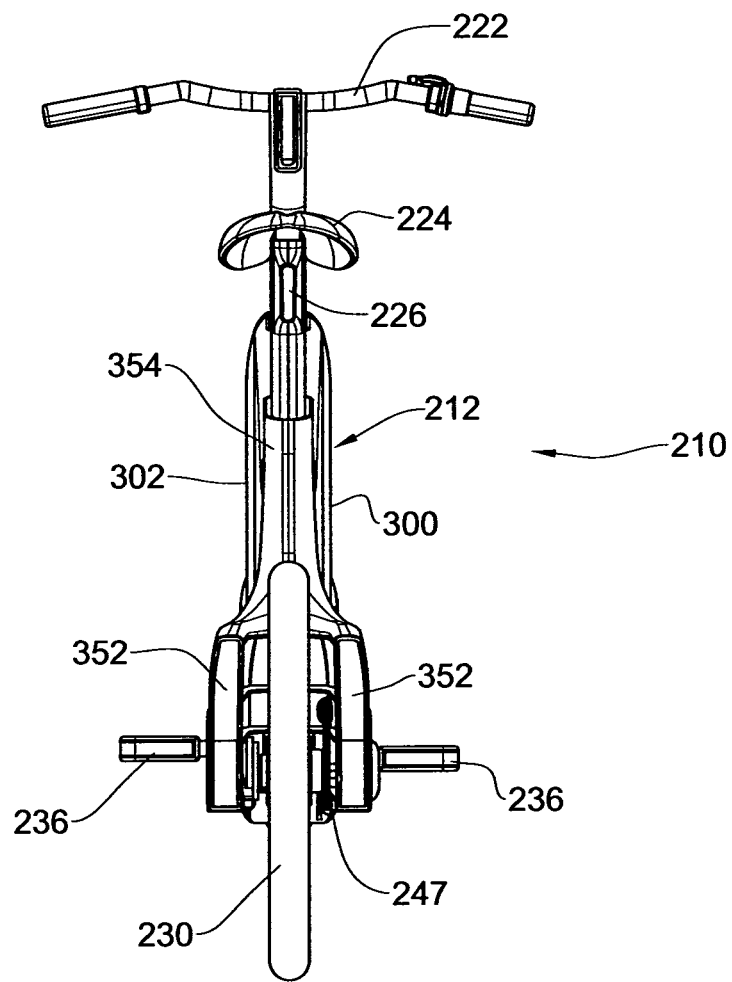
FIG. 25 is a rear view of the bicycle.
Figure 26:
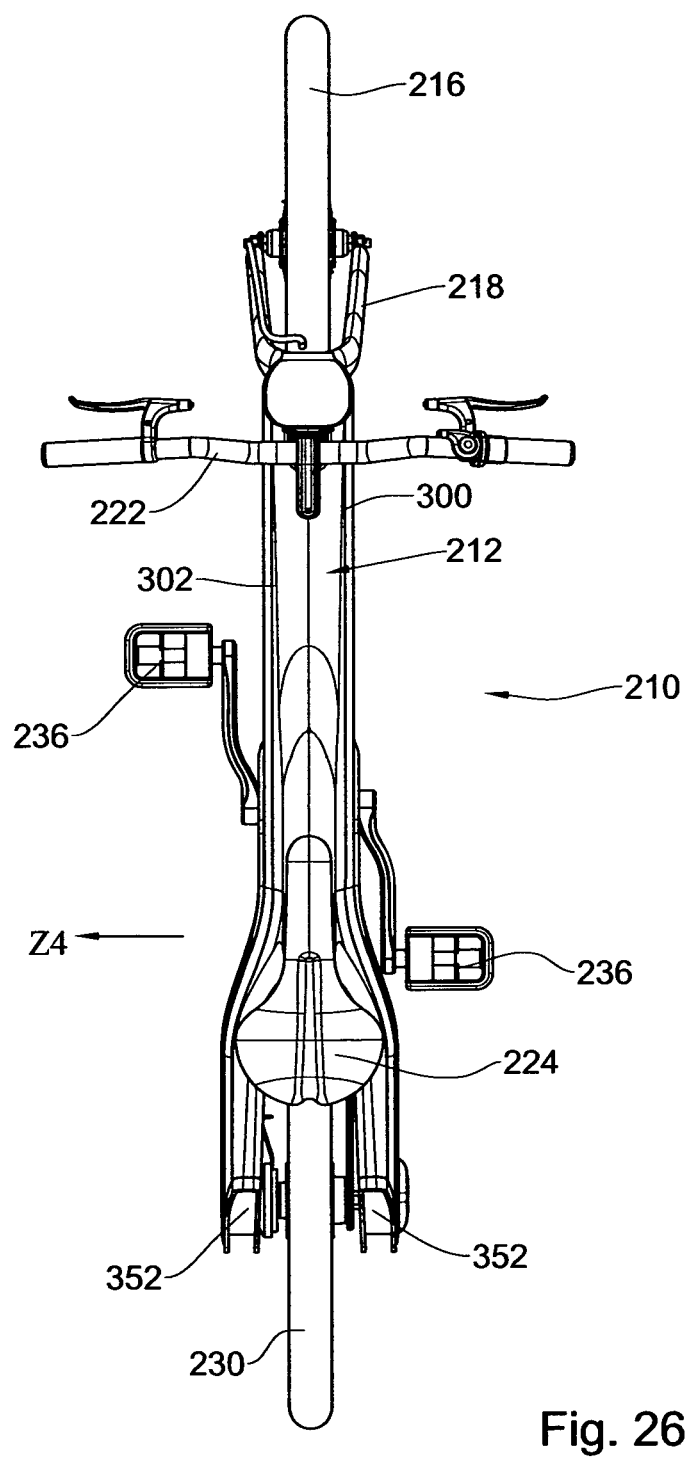
FIG. 26 is a top view of the bicycle.
Figure 27:
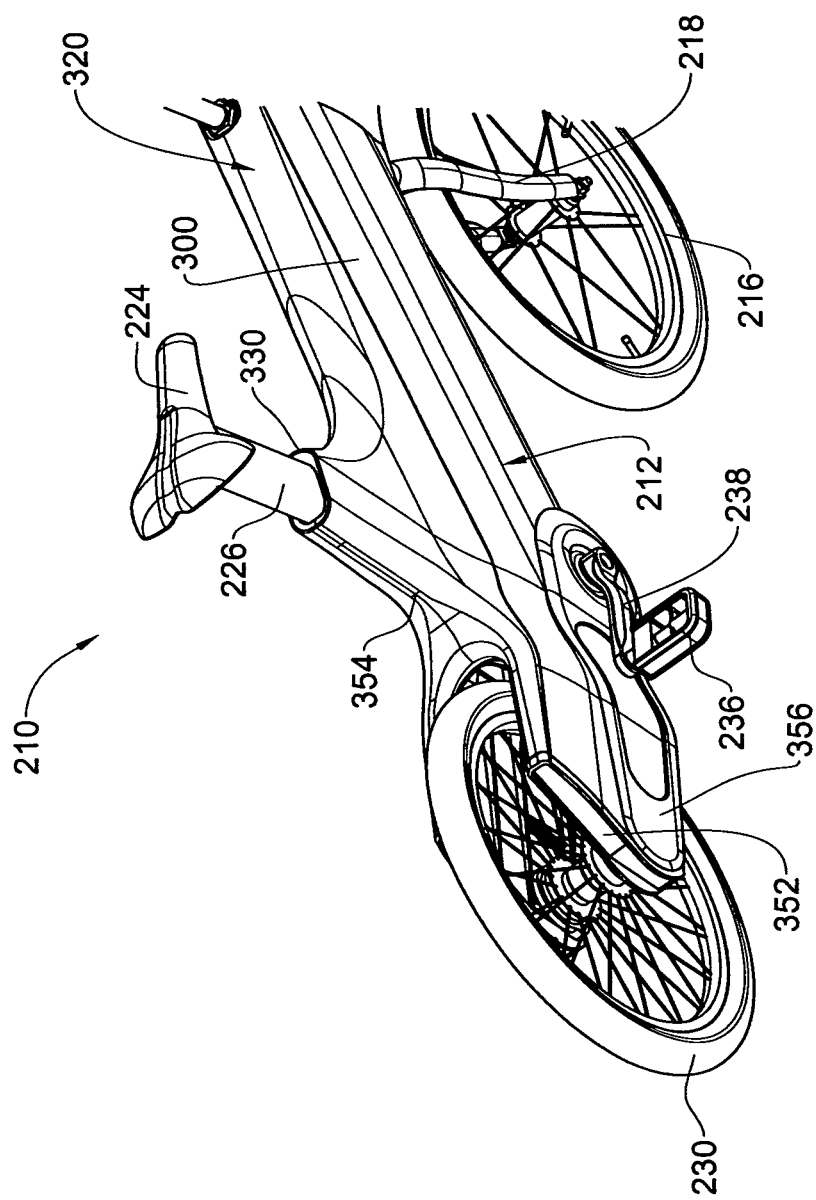
FIG. 27 is a rear right perspective view of the bicycle.
Figure 28:
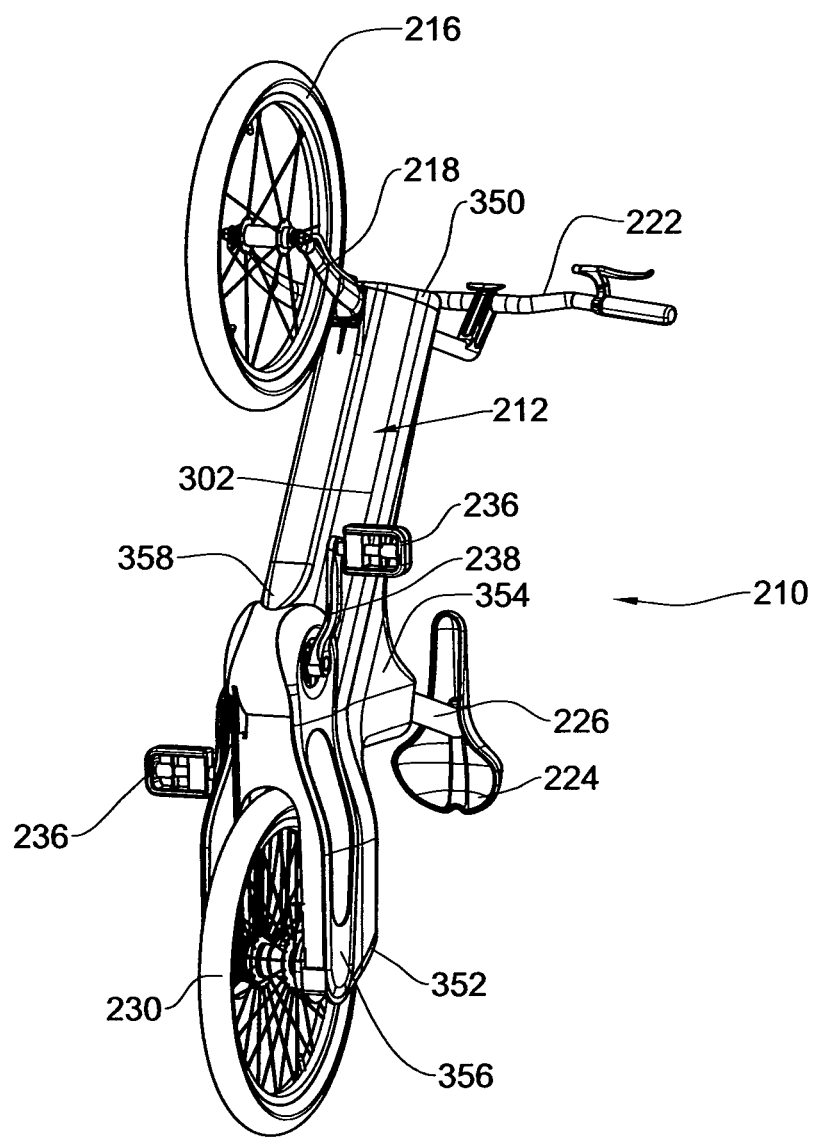
FIG. 28 is a bottom perspective view of the bicycle.
Figure 29:
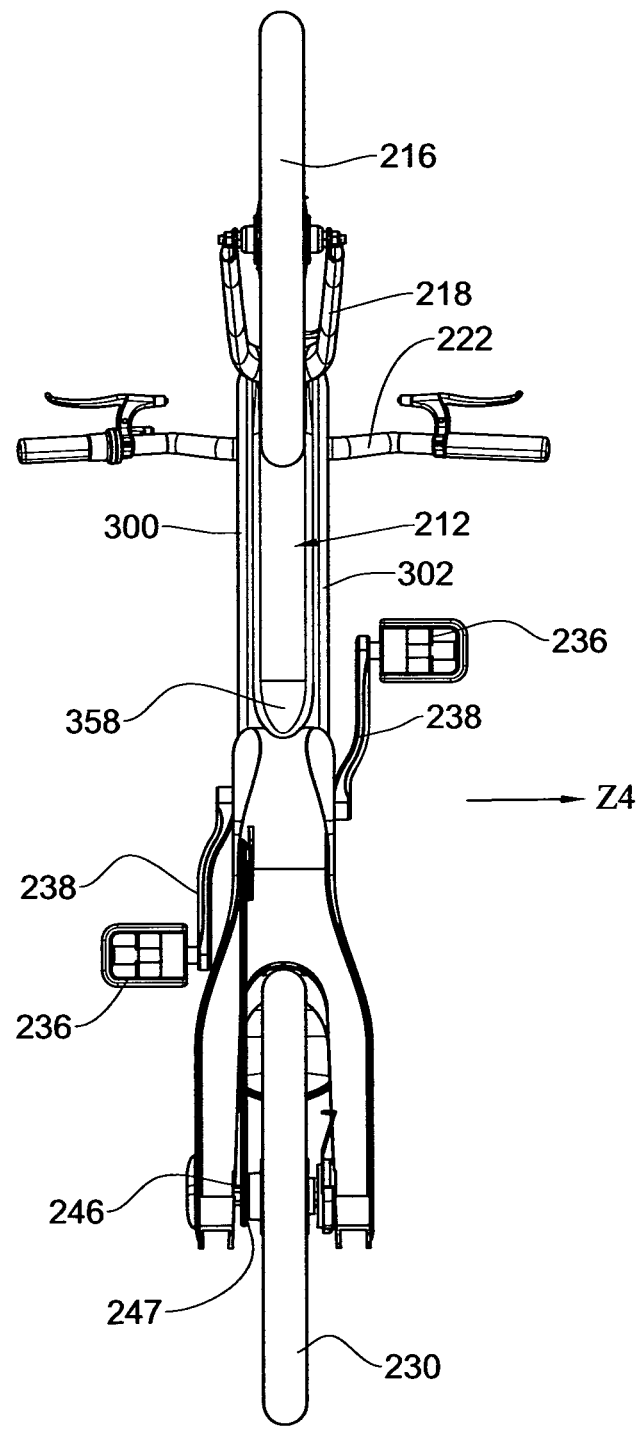
FIG. 29 is a bottom view of the bicycle.
Figure 30:
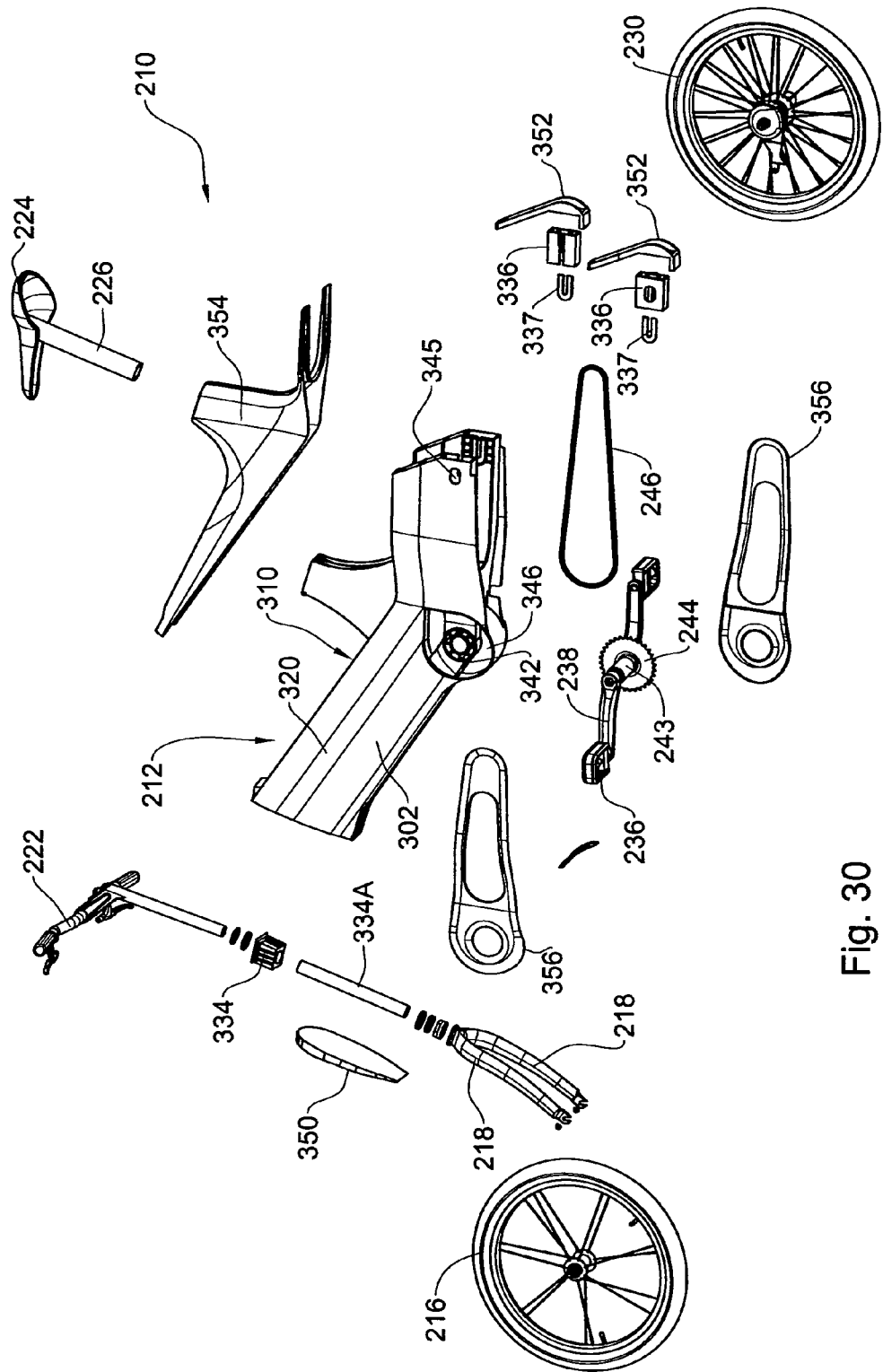
FIG. 30 is an exploded perspective view of the bicycle.

Referring to FIGS. 1 to 21, a bicycle according to a first embodiment of the invention, generally designated 10, comprises a bicycle frame 12, to be discussed hereinafter in further detail, a front wheel 16 rotatably secured to a fork 18 which in turn is pivotally secured to the frame 12 and manipulatable by means of a handle bar 22, a saddle 24 mounted on a seat post 26 which in turn is secured to the housing 12, a rear wheel 30 rotatably secured to the frame 12 by means of a rear axle 32 a pair of paddles 36 articulated to crank arms 38 secured to the frame 12 by a crank assembly 40 for rotating a front gear 44 engaged with chain 46 which in turn is engaged with a gear system (not shown) of the rear wheel 30.

Other components of the bicycle, such as front panel 50, rear panel 52, etc. are provided, most of which being of aesthetic value other than functional.

The following disclosure directed in particular to the construction of frame 12, is made with reference to all of FIGS. 1 to 21, however specifically to FIGS. 10 to 21 in which the frame can be seen in further detail by the sectioned and partial frame drawings.

As can be seen, the frame 12 of the bicycle is in fact a frame structure comprising a first frame member 100 and a second frame member 102 fixedly and integrally secured to one another, extending juxtaposed, however spaced apart thus defining therebetween an internal or inner space 104.

The first frame 100 and the second frame 102 are double walled namely each comprises an outside wall 100A and 102A, respectively, and an inside wall 100B and 102B, respectively, with said space 104 extending between said inner, facing walls 100B and 102B.

As can be noted, each of the first frame and second frame are shell-like structures reinforced by a plurality of longitudinally extending support ribs 111 extending substantially parallel to one another.

In the first embodiment, the first frame and the second frame are uniformly integrated as a single molded article, manufactured by plastic core-injection molding. It is however appreciated that the first frame and the second frame may be independently manufactured and can be fixedly articulated to one another, as will be further discussed hereinafter.

Frame structure 12 is a rigid structure suitable to bear loads which may reside in a bicycle during its normal course of operation.

The support rim 111 extends substantially parallel to one another thus enabling withdrawing of core elements during injection molding of the frame structure 12. Further, noting the space residing between the first frame and the second frame, it is noted that the frames have a front portion designated 120 (FIGS. 17 to 19) wherein the first frame 100 and the second 102 are substantially parallel to one another, wherein the inner walls 100B and 102B are substantially flat, thus enabling easy introduction and withdrawal of molding cores.

Likewise, at a front-most end of the frame 12 there is a longitudinal cavity 128 and a central cavity 130, both having a substantially rectangular cross section extending the height of the frame 12. The front cavity 128 serves for supporting the front fork 18 with its associated handlebar 22 by means of bushing support blocks 134A and 134B (best seen in the exploded view of FIG. 9). The rear cavity 130 serves for supporting the seat post 26 bearing at its upper end the saddle 24, wherein said post is supported within the cavity 130 by means of a support block 138 (FIG. 9) facilitating adjustment of the saddle elevation. At a lower end of the cavity 130 there is provided a crank support 142 integrally molded with the frame members (as seen for example in FIGS. 13, 20, 21 and others). Best seen in FIG. 19, the crank support 142 is in fact split and comprises a recess 146 which at the assembled position accommodates the front gear 44 (see for example FIGS. 9 and 13) allowing its free rotation about the crank assembly 40.

Whilst the front portions of the first frame 100 and second frame 102 are substantially parallel to one another, their rear portions 100C and 102C respectively, namely those extending backwards from the rear cavity 130 slightly taper outwardly to facilitate accommodation of the rear wheel 30 and the associated gear assembly mounted thereon as seen in some of the drawings.

In accordance with this example, the support ribs 111A of the rear portions 100C and 102C are parallel to one another within said first frame and second frame respectively though do not coincide with the corresponding ribs of the front portions of said first frame and second frame owing to the angular diversion of said frame portions.

As seen in the figures, the molded frame structure 12 is a single, homogeneous article free formed with all necessary receptacles and apertures for receiving a plurality of articulating elements, coupling mechanism, bushings, axles and the like, setting examples rear axle openings 145, crank receptacle 147 etc.

As mentioned hereinabove and as appreciated from the drawings, (e.g. FIGS. 8, 10, and others) the transmission assembly composed of the front gear 44, chain 46 and rear transmission gear 47 (one or more such gears may be provided, as known in the art) are all received between the first frame 100 and second frame 102 in an eye pleasing and safe manner.

Furthermore, the arrangement is such that the bicycle composed of a frame 12 as disclosed herein, may be easily assembled and knocked down, with the entire assembly being substantially light weight, owing to the light weight of the frame.

Even more so, the space 104 extending between the first frame 100 and the second frame 102 may serve for receiving an electric motor, a power source (battery) and gearing unit for gear engagement with the front gear 44 thus converting the bicycle into a moped. Such an arrangement may be modular, namely the electric motor with its respective power unit, gear coupling and control assembly may be added at any time.

Still noted, the rear panel 52 may be easily replaced by a plurality of modular elements such as a basket, canopy, mud descanter, child seat, tail light, bottle holder, etc. Likewise, the front panel 50 may just as well be formed in different patterns, also to support a front basket, headlight, etc.

In alternative variations of the first embodiment, the first frame and the second frame may be separately molded and then fixedly supported and articulated to one another (e.g. by laser welding or by the use of bolts and studs) thus giving rise to a support frame similar to the composed structure as illustrated hereinbefore.

Referring to FIGS. 22 to 50, a bicycle according to a second embodiment of the invention, generally designated 210, is similar to the first embodiment as disclosed herein, mutatis mutandis, but with some differences, as will become clearer herein. The bicycle 210 comprises: a bicycle frame structure 212, to be discussed hereinafter in further detail, a bicycle steering structure 400, a bicycle seating structure 500, a rear wheel 230 and propelling system 600.

Figure 31:
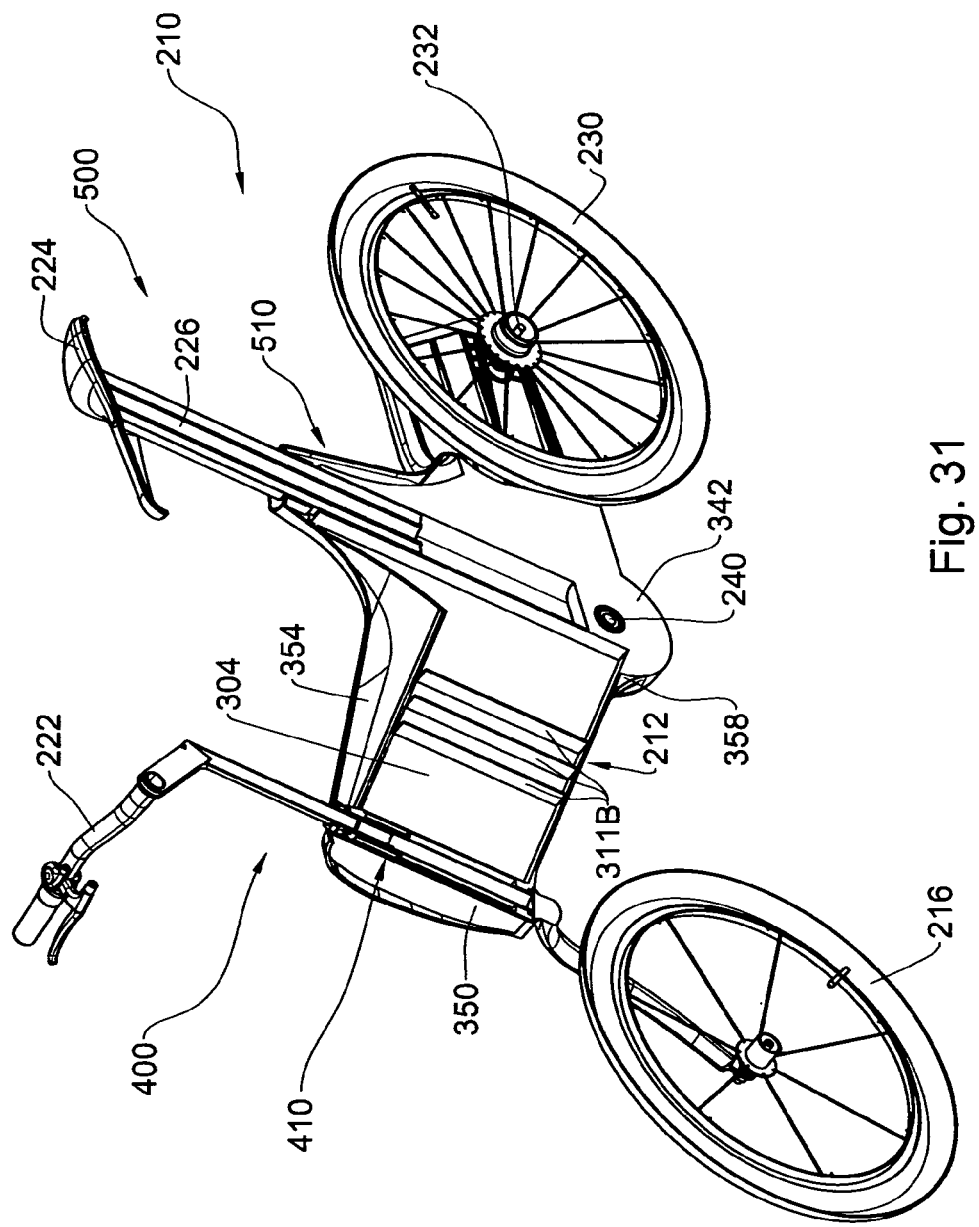
FIG. 31 is a vertical section along the bicycle.
Figure 32:
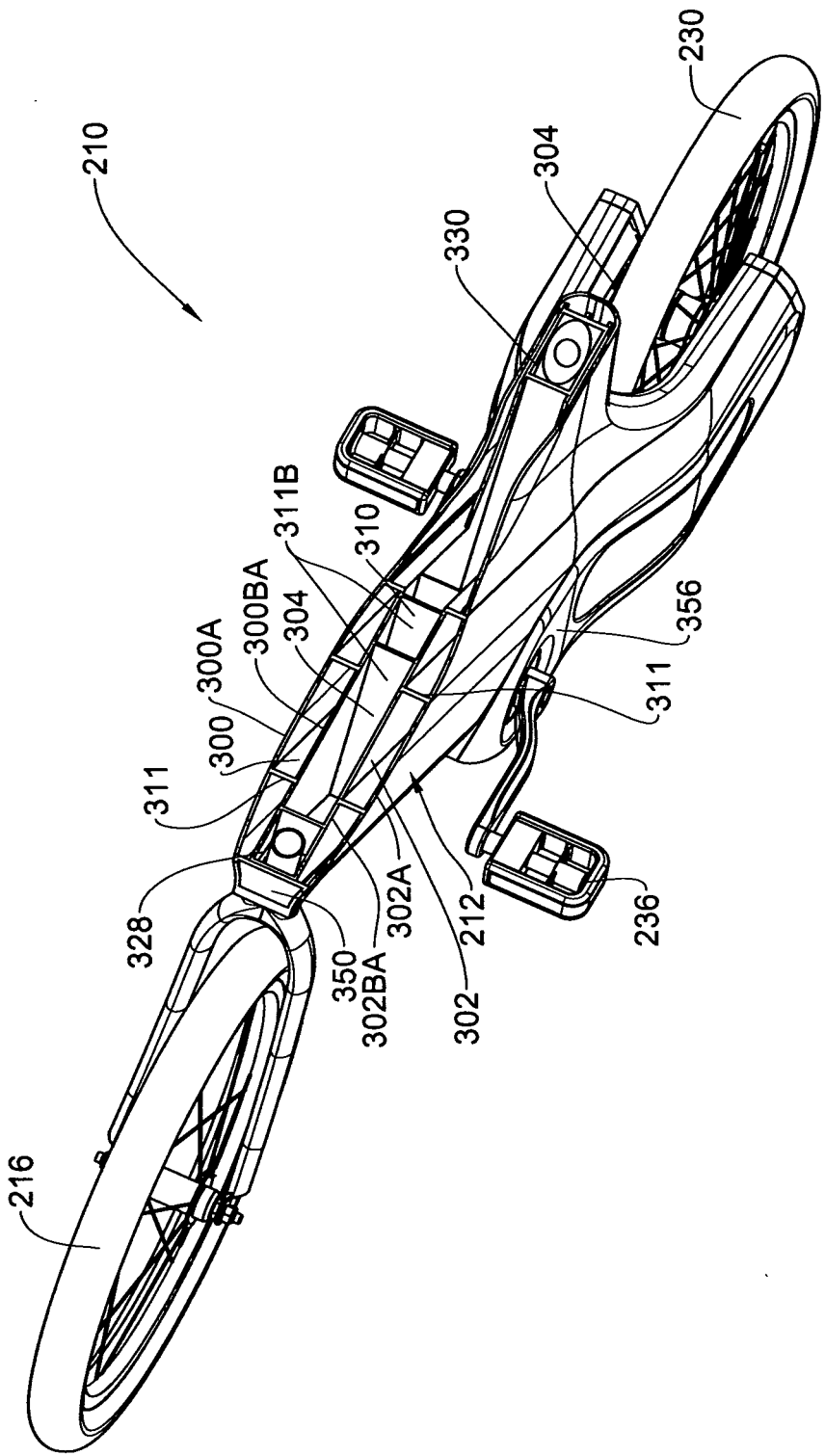
FIG. 32 is a top perspective view of the bicycle sectioned along the plane marked XI in FIG. 22.

Referring in particular to FIG. 31, the bicycle steering structure 400 comprises a front wheel 216 rotatably mounted to a fork 218, which in turn is pivotally mounted to the frame structure 212 via a first mounting structure 410 and manipulable for steering the bicycle by means of a handle bar 222.

The bicycle seating structure 500 comprises a saddle 224 mounted on a seat post 226 which in turn is mounted to the frame structure 212 via second mounting structure 510.

The rear wheel 230 is rotatably secured to the frame structure 212 by means of a rear axle 232. The propelling system 600 comprises a pair of paddles 236 articulated to crank arms 238 secured to the frame structure 212 by a crank assembly 240 for rotating a front gear, comprising at least one paddle sprocket 244 engaged with chain 246 which in turn is engaged with a gear system (in the form of rear gear comprising at least one wheel sprocket 247) of the rear wheel 230.

Other components of the bicycle, such as front panel 350, rear plugs or panels 352, top panel 354, side panels 356 (for covering the recesses 346), a small bottom panel 358, etc. are provided, although in alternative variations of this embodiment, one or more of these components may be omitted The following disclosure directed in particular to the construction of frame structure 212, is made with reference to all of FIGS. 22 to 50, however specifically to FIGS. 38 to 42, 49 and 50 in which the main portion of the frame can be seen in further detail by the sectioned and partial frame drawings.

As can be seen, the frame structure 212 of the bicycle has a top T, bottom B, front end FE, and a rear end RE (also referred to interchangeably herein as an aft end), and further comprises a first frame member 300 and a second frame member 302.

The frame structure 212 is configured for being manufactured, in this embodiment, as a unitary, integral frame body 310.

In particular, the frame body 310 of the frame structure 212 is configured, in at least this embodiment, for being manufactured by plastic core-injection molding techniques, for example single plastic core-injection mold or the like, using suitable mold cores that are removable along a number of particular directions with respect to a mold after plastic is injected into the mold and solidifies. In the second embodiment, there are six such directions (also interchangeably referred to as corresponding axes) are correspondingly marked as Z1, Z2, Z3, Z4, Z5 and Z6 in FIGS. 22 and 41, for example, though in alternative embodiments of the invention, the frame body may be configured for being manufactured using suitable mold cores that are removable along less than six directions, for example one or two, or three, or four, or five directions or axes, or indeed for being manufactured using suitable mold cores that are removable along more than six directions, for example seven, or eight, or nine or ten, or eleven or twelve or more than twelve directions or axes.

Herein, the terms "direction" or "directions" are used interchangeably with "axis" and "axes".

The first frame member 300 and the second frame member 302 are formed as double walled panels generally extending from said front end FE to said rear end RE, and are in juxtaposed lateral spaced relationship via a plurality of frame spacer elements 311B, defining an inner space 304 (see FIGS. 37 and 41 for example) therebetween. Spacer elements 311B extend in a general vertical direction, parallel to direction Z2, and form corresponding parallel rectilinear channels 710 also extending in direction Z2. The channels 710 are of uniform cross-section, although in alternative variations of this embodiment the channels may have a smoothly diminishing cross-section in a direction Z2 from an outside towards the interior of the frame structure, to allow complementarily wedge-shaped mold cores to be removed therefrom.

The frame structure 210 comprises a forward portion 320 that is joined to an aft portion 390 at transition station TS, which in this embodiment is an imaginary plane, or alternatively may be any other suitable junction, physical or imaginary, between the two portions.

Thus, each one of the first frame member 300 and the second frame member 302 comprise a respective forward panel portion 300D, 302D, joined to a respective aft panel portion 300C, 302C, at the aforesaid transition station TS. More specifically, the respective forward panel portions 300D, 302D are joined together along the majority of the length of the forward panel portions 300D, 302D, i.e., along direction Z1, via panel webs 311B, while the respective aft panel portions 300C, 302C are separated from one another along the majority of the length of the respective aft panel portion 300C, 302C, i.e., along direction Z3, to create an aft open space 304C. Aft spacer elements 311C are provided between the respective aft panel portions 300C, 302C to maintain them in the juxtaposed relationship, and are formed as flat webs aligned in direction Z3 (FIG. 42), wherein the respective aft panel portions 300C, 302C are laterally spaced by a larger lateral spacing D2 than the lateral spacing D1 between the respective forward panel portions 300D, 302D, and comprise respective elbow portions 300E, 302E in proximity to the transition station TS (see FIG. 38).

The first frame member 300 and the second frame member 302 each comprise an outside wall, 300A and 302A, respectively, a forward inside wall, 300BA and 302BA, respectively, corresponding to the respective forward panel portions 300D, 302D, and a rear inside wall, 300BB and 302BB, respectively, corresponding to the respective forward aft portions 300C, 302C, with said aft space 304C extending between said aft inner, facing walls 300B and 302B.

Figure 33:
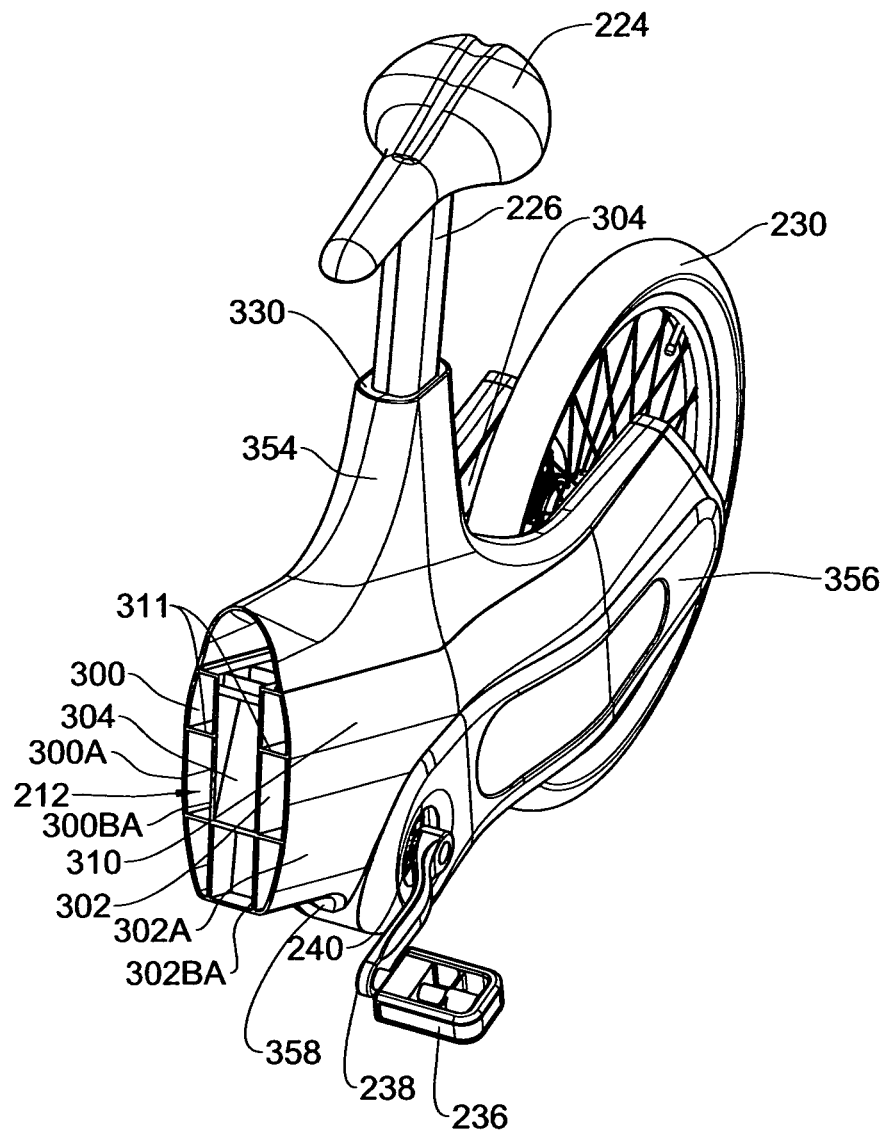
FIG. 33 is a perspective e view of the bicycle sectioned along the plane marked XII in FIG. 22.
Figure 34:
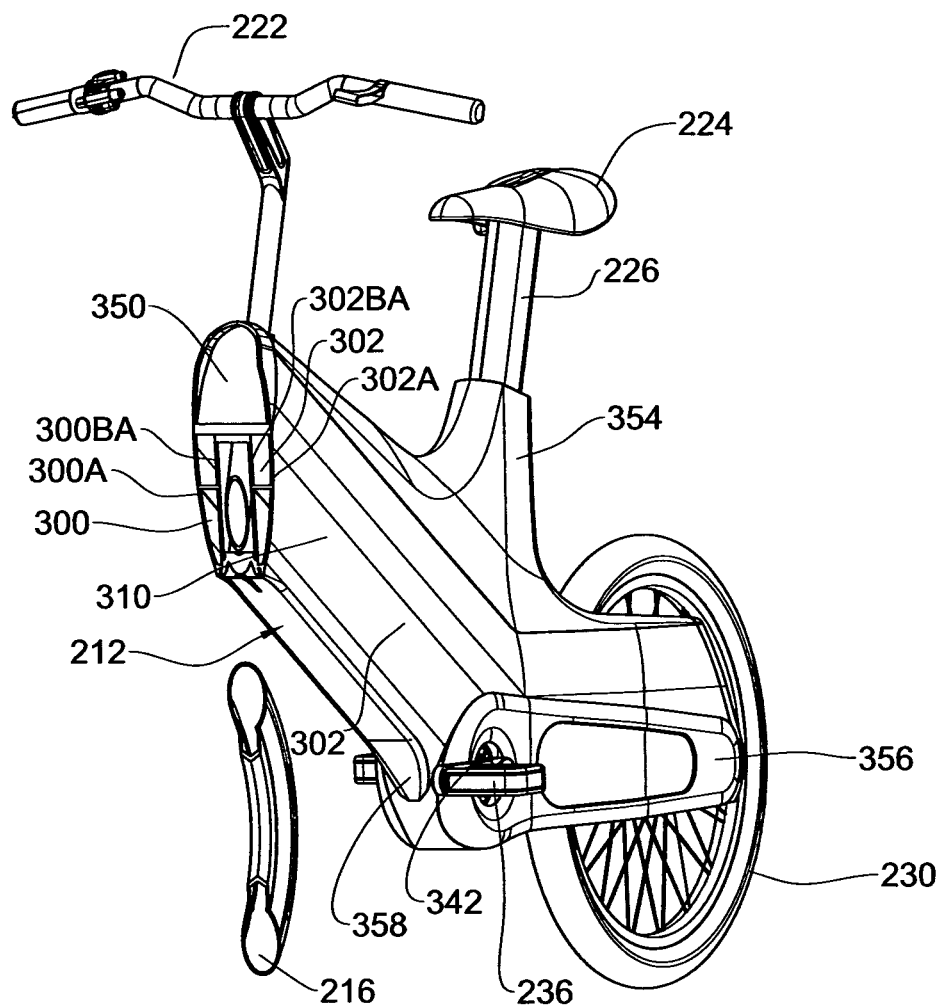
FIG. 34 is a bottom perspective view sectioned along plane marked XII in FIG. 22.
Figure 35:
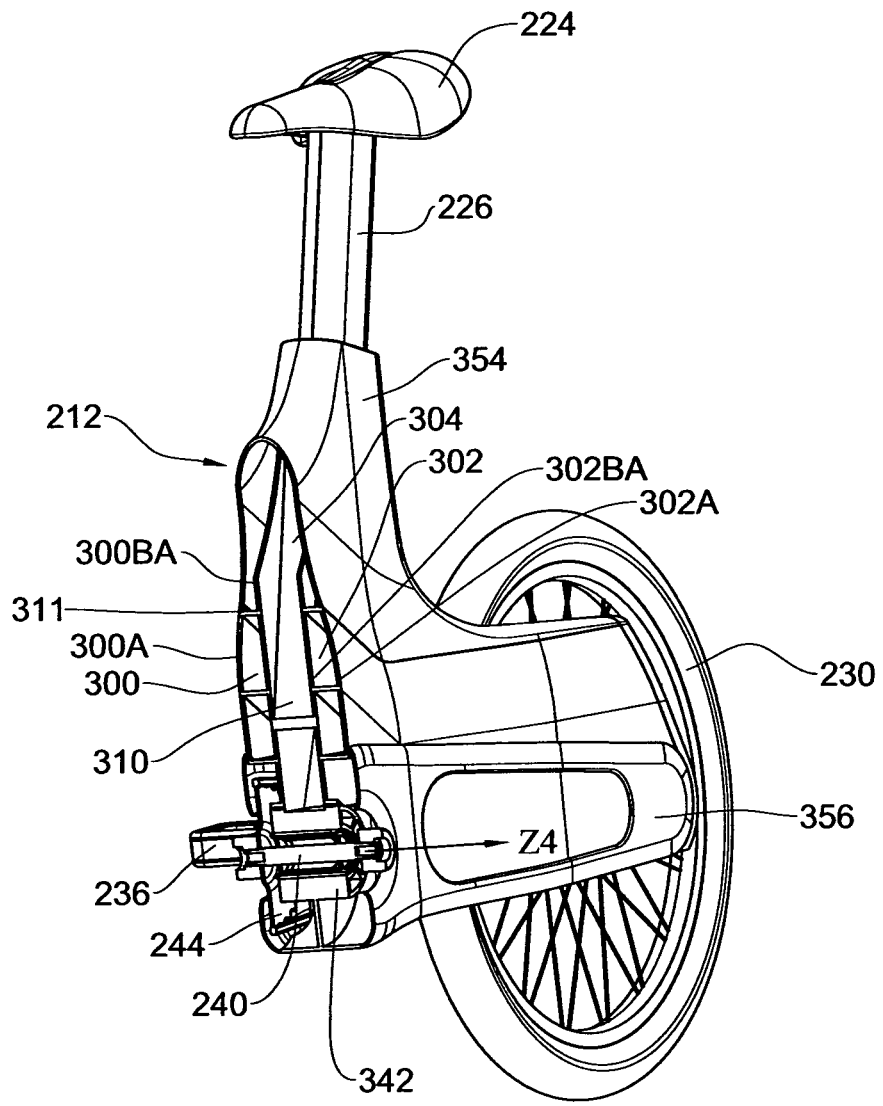
FIG. 35 is a bottom perspective view sectioned along plane XIV in FIG. 22.
Figure 36:
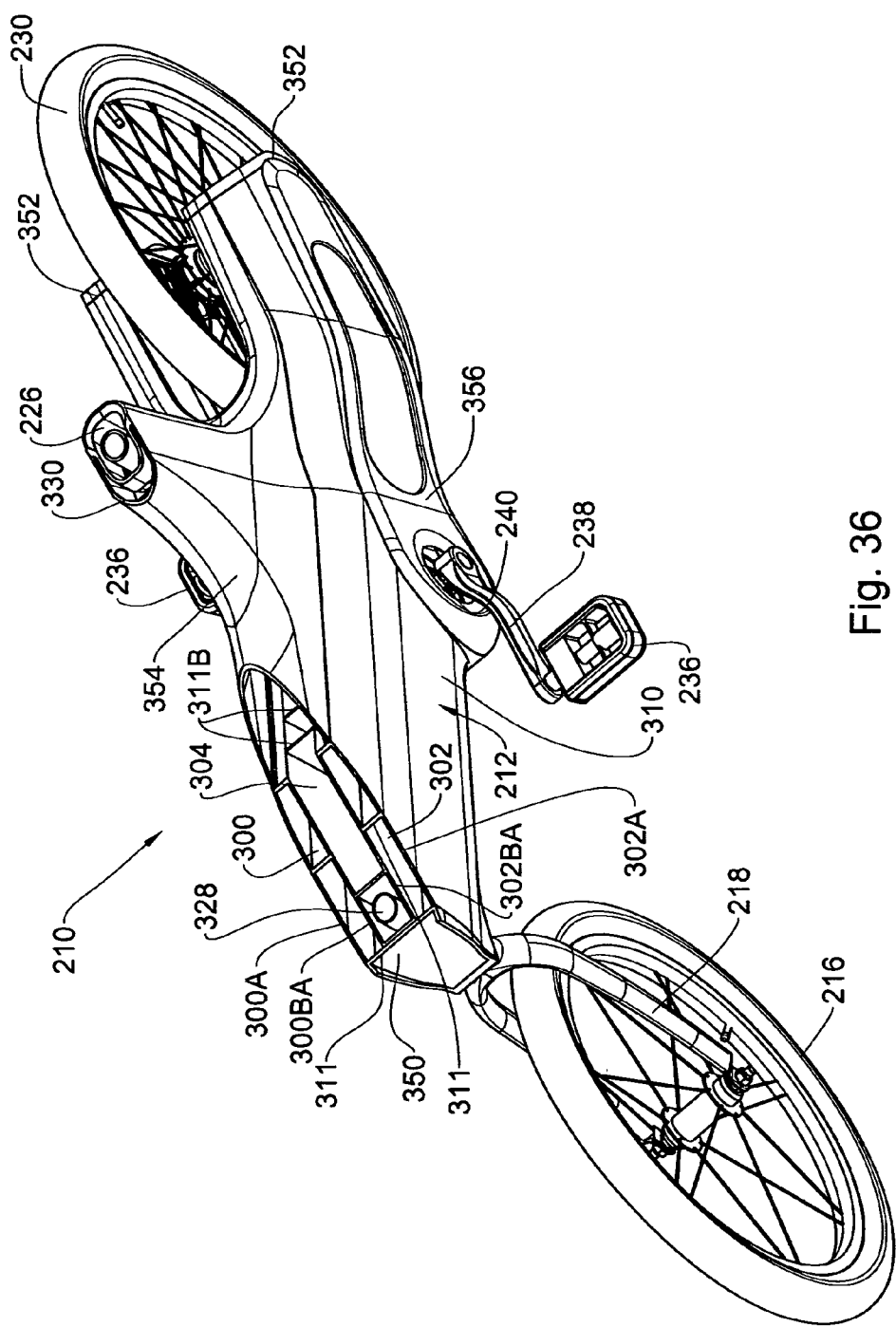
FIG. 36 is a perspective view of the bicycle sections along plane XV in FIG. 22.
Figure 37:
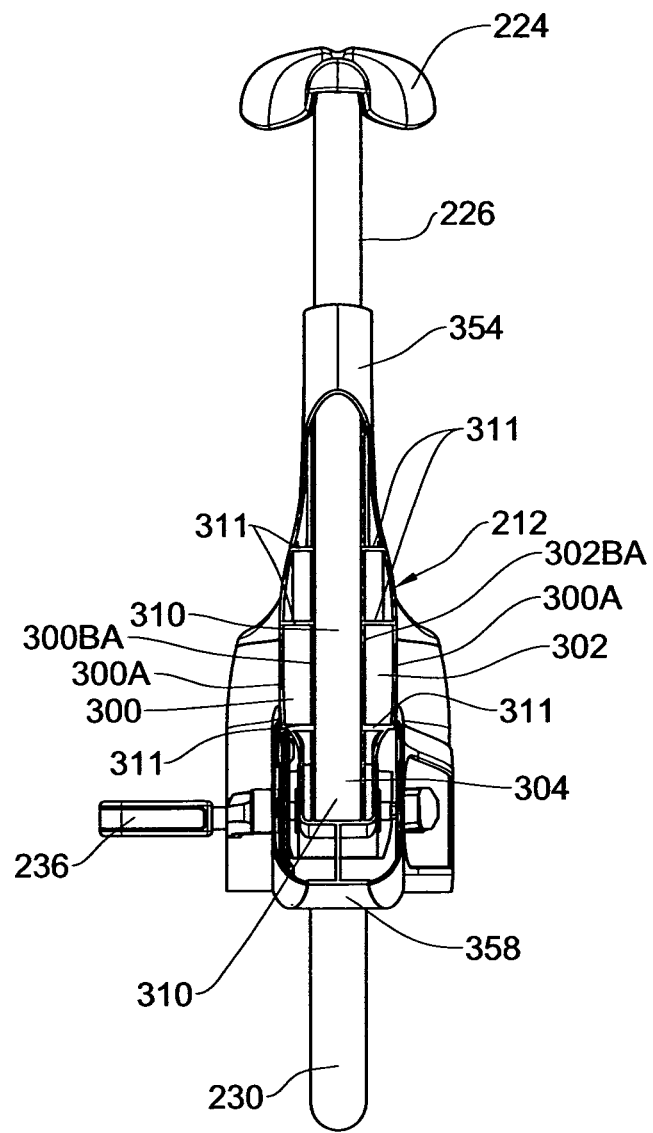
FIG. 37 is front view sectioned along section XIV-XIV in FIG. 22.
Figure 38:
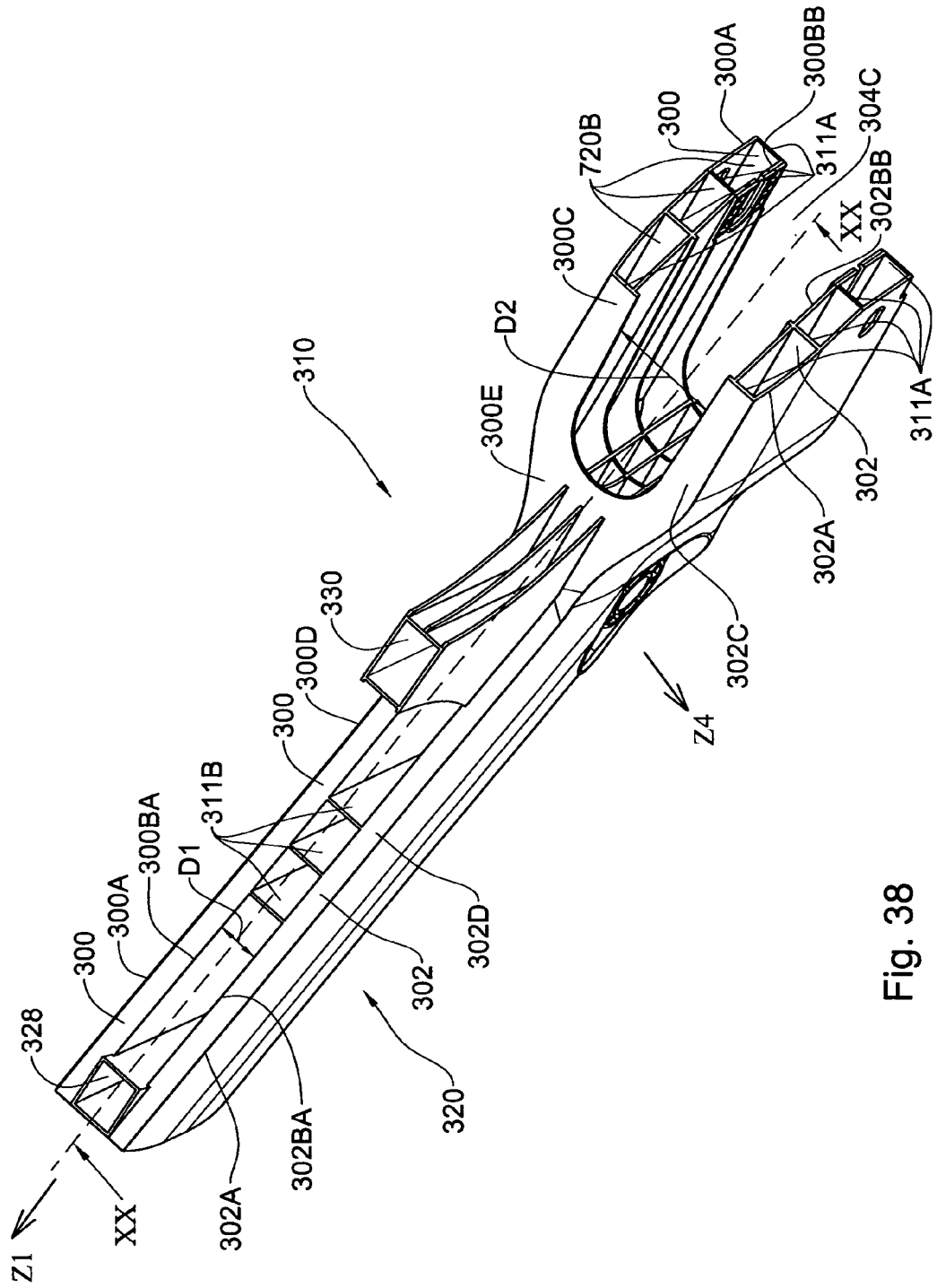
FIG. 38 is a rear, top perspective view of only the bicycle frame of the disclosed subject matter.
Figure 39:
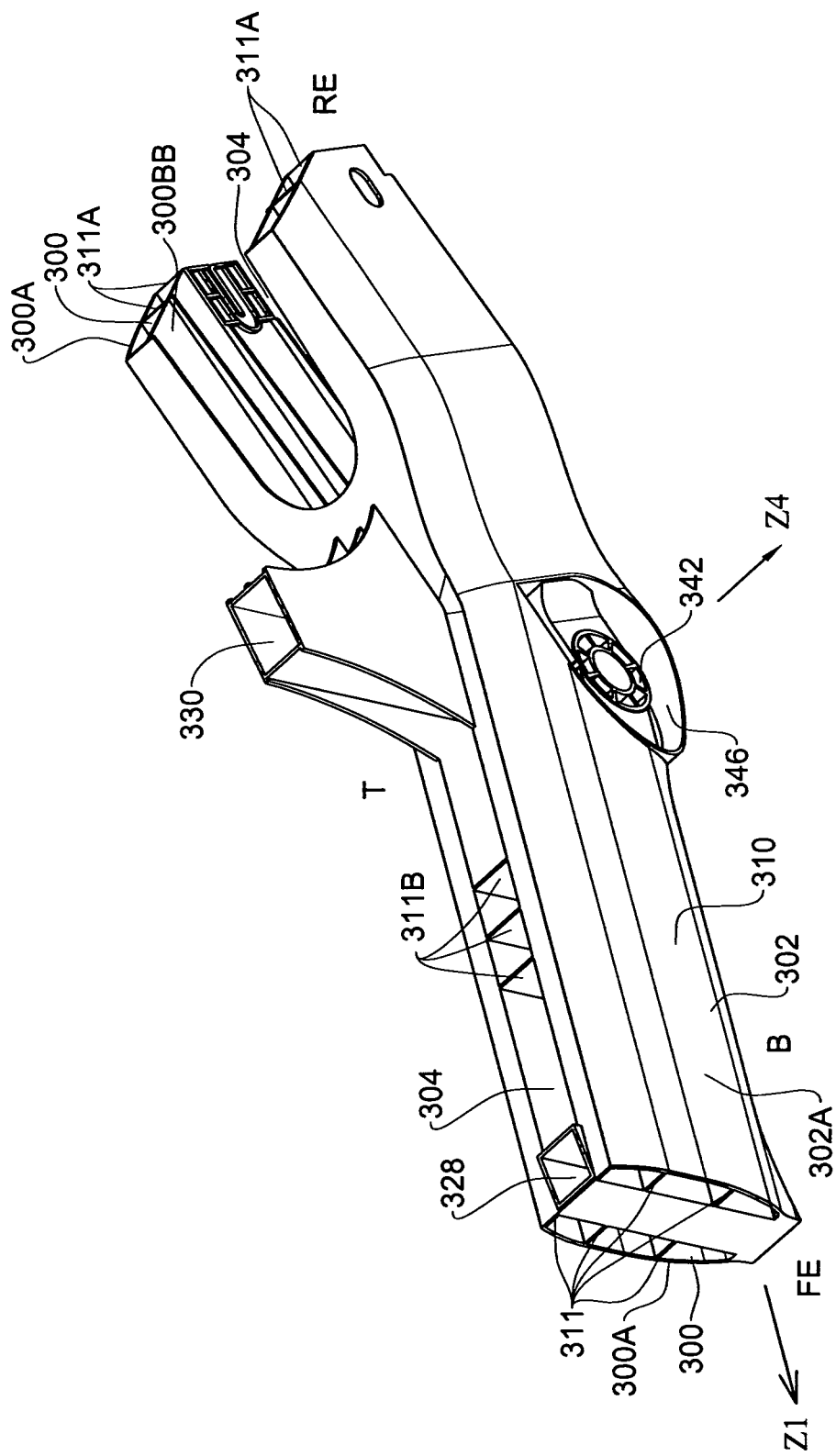
FIG. 39 is a front, top perspective view of the frame of FIG. 38.
Figure 40:
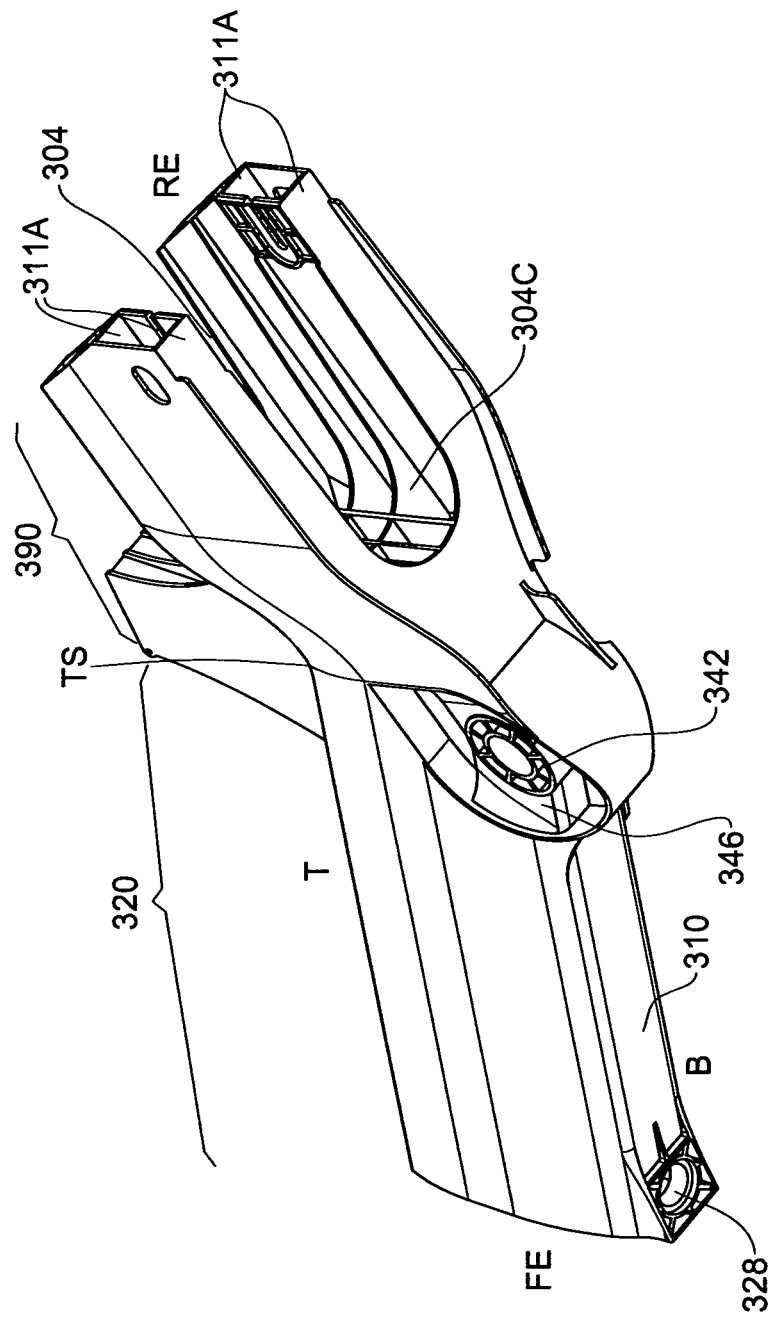
FIG. 40 is a bottom perspective view of the bicycle frame.

As can be noted, for example in FIG. 33, the first and second frame members 300 and 302 each comprise a pair of spaced panel walls internally reinforced by a plurality of elongate rectilinear support ribs 311 and 311A, also referred to interchangeably herein as panel webs, extending substantially parallel to one another, i.e., in spaced parallel relationship with respect to one another, and internally joining the respective panel walls, forming hollow rectilinear channels 720 therebetween. The hollow channels 720 are substantially parallel to one another in each one of the frame members. The support ribs 311 and 311A are formed as substantially flat strips for at least a majority of a portion of the wall panel in a direction parallel to the support ribs 311 and 311A, roughly aligned or inclined with the forward-aft direction of the frame structure 212.

However, in this embodiment, the hollow channels 720 are not contiguous from the front end FE to the rear end RE, though in alternative variations of this embodiment they may be contiguous from the front end FE to the rear end RE. Rather, in this embodiment, the respective forward panel portions 300D, 302D are formed having one set of such rectilinear channels 720A extending in a direction parallel to axis Z1, while the respective aft panel portions 300C, 302C are formed having another set of such rectilinear channels 720B, but extending in a direction parallel to axis Z3, wherein Z1 is different from Z3. The first channels 720A are bounded internally by an internal wall 725 (FIG. 42) associated with the transition station TS. The second channels 720B comprise a set of outer rectilinear channels 720B', running the length of the aft panel portions 300C, 302C where the aft inner, facing walls 300B and 302B, essentially join with the outside wall 300A and 302A, at a position marked P, corresponding to a part of the elbow portions 300E, 302E in proximity of the transition station TS, as may be seen best in FIGS. 42 and 49. The second channels 720B also comprise a set of inner channels 720W' essentially formed between a respective forward part of rear inside walls 300BB and 302BB, and a respective part of the elbow portions 300E, 302E between position P and the transition station TS. The inner channels 720B" and the outer channels 720B' are thus rectilinear, and parallel to direction Z3.

Thus, in accordance with this embodiment, the support ribs 311A of the rear portions 300C and 302C are parallel to one another within said first and second frame members 300 and 302, respectively, though do not coincide with the support ribs 311 in the front portion 320 of the frame structure 212 owing to the angular diversion between these rear and front frame portions via transition station TS.

Figure 42:
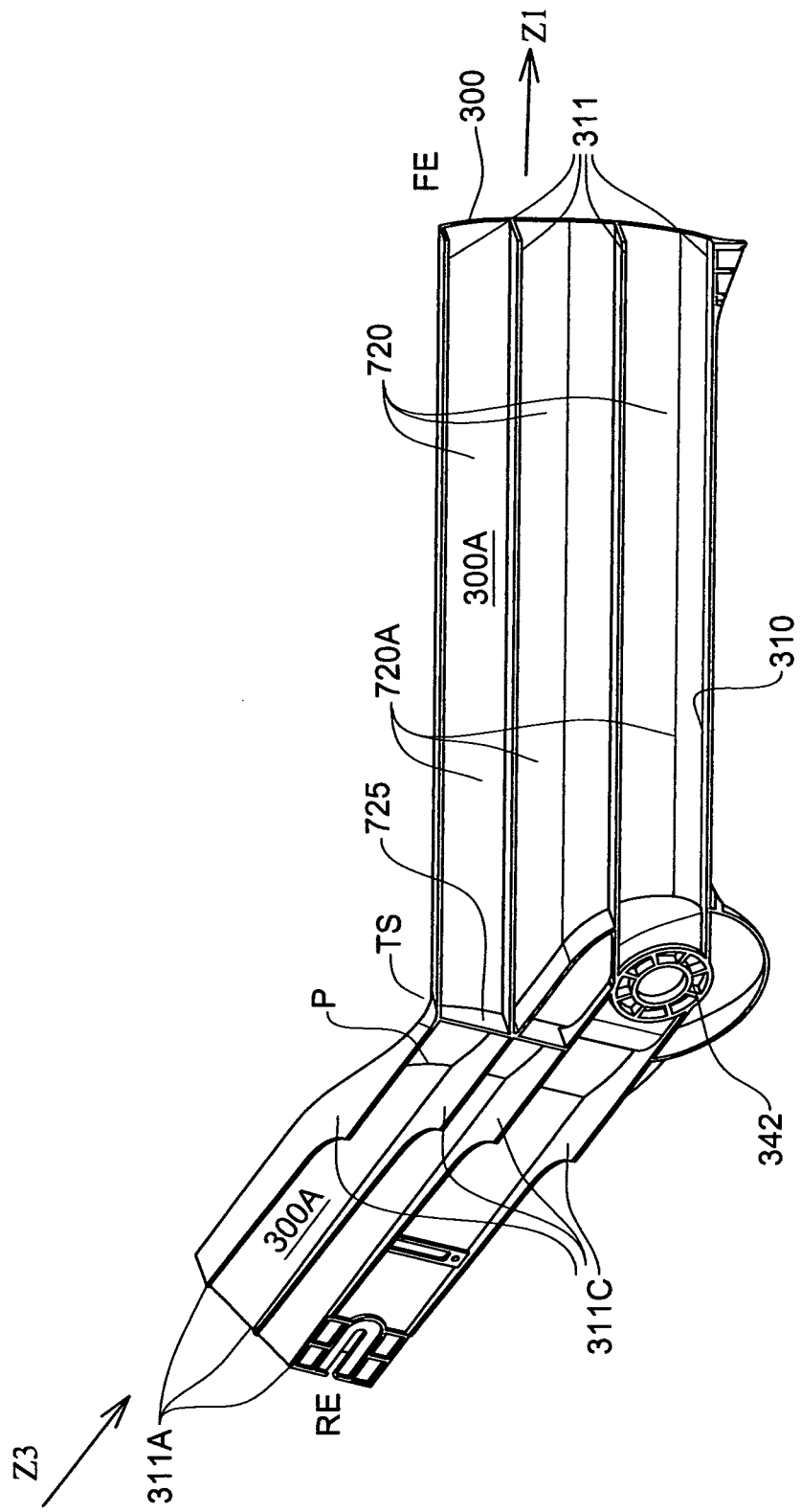
FIG. 42 is a frame element of FIG. XX, sectioned along XXI-XXI.
Figure 43:
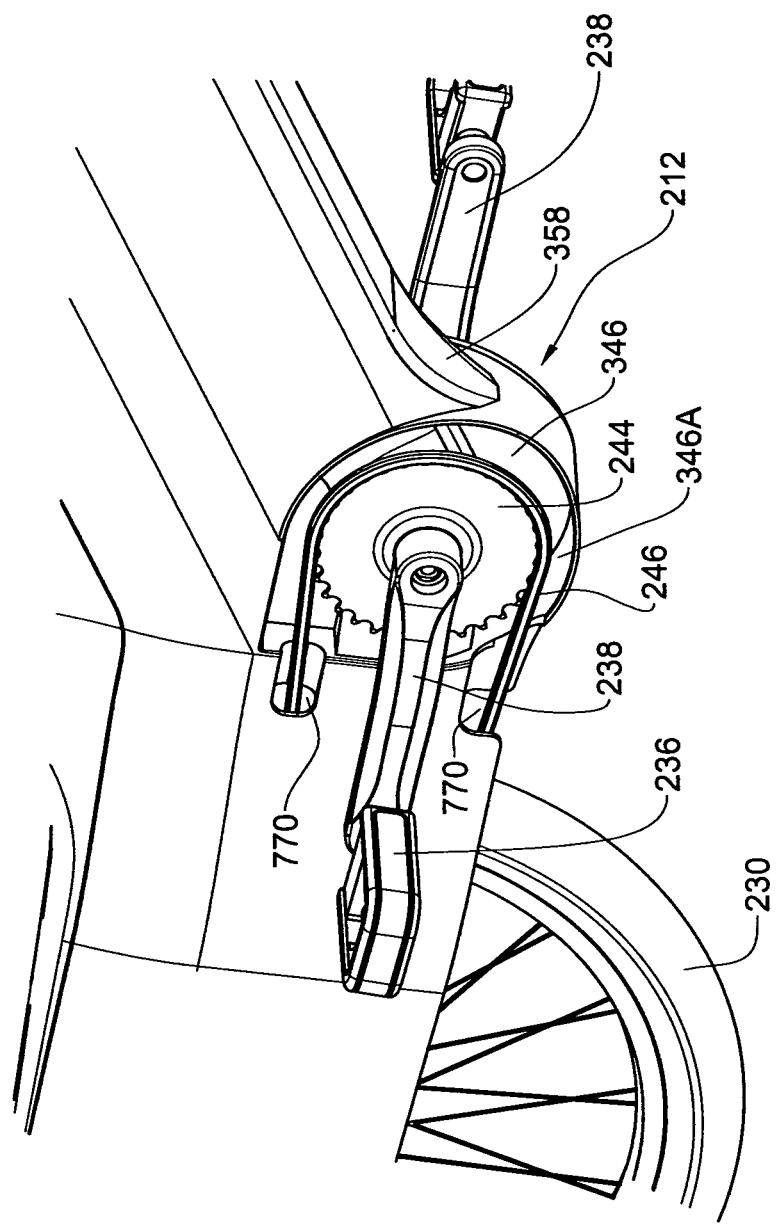
FIG. 43 is perspective view of a portion of the frame and the front gear of the bicycle, exposed due to removal of a side panel of the frame.

The channels 720 are of uniform cross-section, for at least a major portion of their length, as may be seen, for example, in FIG. 42, although in alternative variations of this embodiment these channels may have a smoothly diminishing cross-section in a direction Z3 from an outside towards the interior of the frame structure, to allow complementarily wedge-shaped mold cores to be removed therefrom.

In this embodiment, directions Z1 and Z3 are substantially co-planar, or are defined along planes that are substantially parallel to one another, and also parallel to a reference vertical plane. This reference vertical plane may be the median plane of the bicycle rider when sitting on the bicycle, for example. However, in alternative variations of this embodiment, directions Z1 and Z3 may be defined along planes that intersect one another, i.e., that diverge with respect to one another.

While the rear portions 300C and 302C are laterally spaced one from another by spacing D2 (see FIG. 38), their respective channels 720B are substantially parallel to one another and to direction Z3. Nevertheless, in alternative variations of this embodiment, the respective channels 720B of rear portion 300C may be aligned with a direction or axis Z3' while the respective channels 720B of rear portion 302C may be aligned with a direction or axis Z3", wherein directions Z3' and Z3" (not shown) are not parallel to one another, and for example may diverge. Similarly, while the forward panel portions 300D, 302D are laterally spaced one from another by spacing D1 (see FIG. 38), their respective channels 720A are substantially parallel to one another and to direction Z1. Nevertheless, in alternative variations of this embodiment, the respective channels 720A of forward panel portions 300D may be aligned with a direction or axis Z1' while the respective channels 720A of forward panel portion 302D may be aligned with a direction or axis Z1", wherein directions Z1' and Z1" (not shown) are not parallel to one another, and for example may diverge.

The frame structure 212 is formed as a substantially rigid structure suitable for bearing static and dynamic loads which may be generated in a bicycle during its normal course of operation.

Thus, each set of support ribs 311 as well as 311A extend substantially parallel to directions Z1 and Z3, respectively, enabling withdrawal of corresponding mold core elements from the respective channels 720A and 720B during the injection molding process of the frame body 310.

Figure 41:
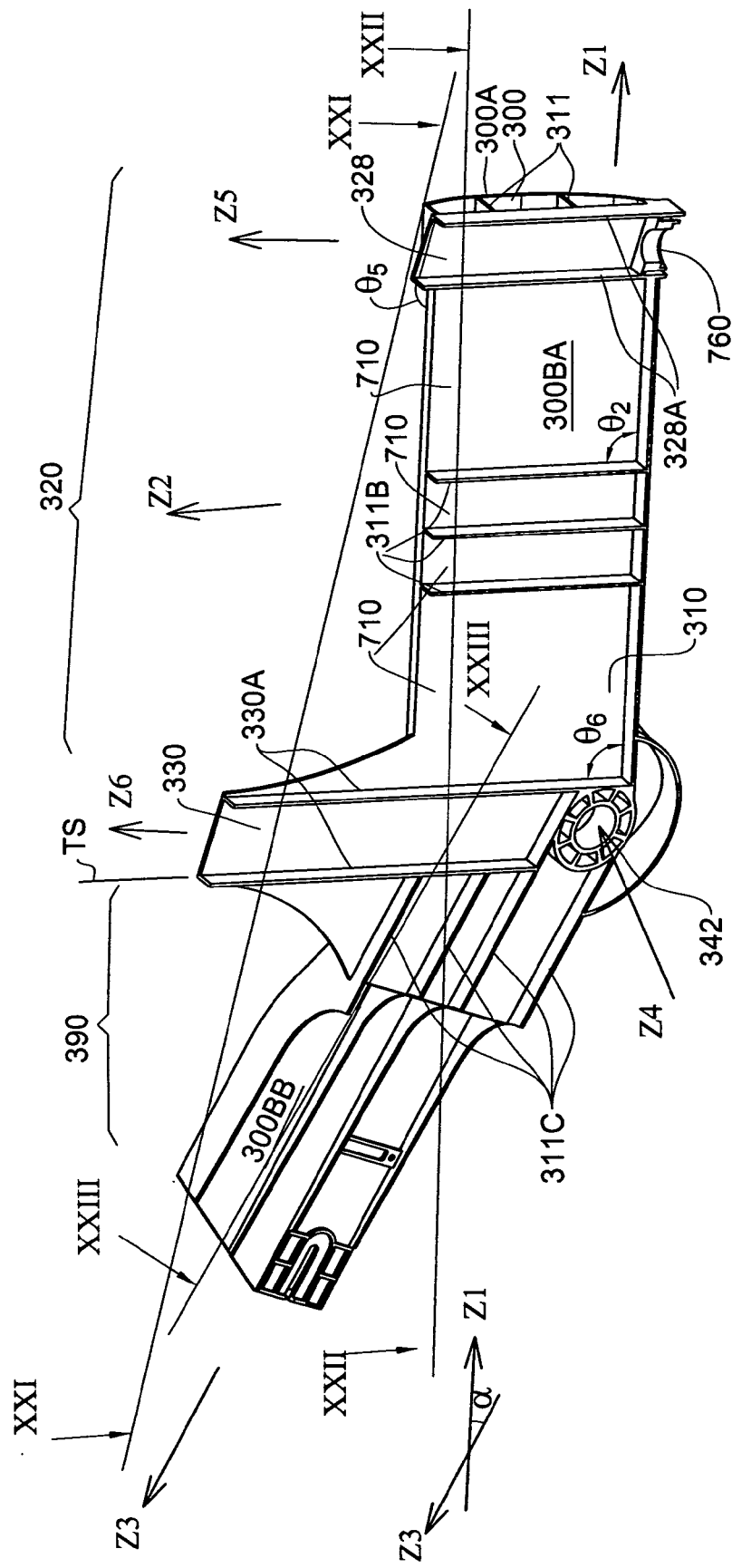
FIG. 41 is a section along XX-XX in FIG. 38.

Referring in particular to FIG. 41, the first mounting structure 410 is in the form of an elongate rectilinear cavity 328 at the front end of the frame structure 212, having a substantially uniform and rectangular cross section, accommodated in inner space 304, and extending in direction Z5, and comprises spaced webs 328A. Similarly, second mounting structure 510 is in the form of a elongate rectilinear cavity 330 close to the transition station TS of the frame structure 212, having a substantially rectangular cross section, accommodated in inner space 304, and extending in direction Z6, and comprises spaced well webs 330A.

In this embodiment, directions Z2, Z5 and Z6 are parallel to one another and are co-planar, or alternatively are parallel to one another and are defined on corresponding planes that are also parallel to one another. Directions Z2, Z5 and Z6 are also different from directions Z1 and Z3, though in this embodiment all of directions Z1, Z2, Z3, Z5 and Z6 are on planes that are parallel to one another, or optionally co-planar. In this embodiment, directions Z2, Z5 and Z6 are at angles θ2, θ5, and θ6, respectively, with respect to direction Z1, and Z1 is at an angle α with respect to direction Z3 (FIG. 41). In this embodiment, angles θ2, θ5, and θ6, are each between about 70 degrees and 90 degrees, inclusive (for example orthogonal), and angle α is between about zero degrees and about 90 degrees, inclusive. In alternative variations of this embodiment, two or more of directions Z2, Z5 and Z6 be non-parallel with respect to one another and may diverge with respect to one another.

Thus, cavity 328 is configured for supporting the front fork 218 with its associated handlebar 222 via shaft 334A by means of bushing support block 334 (best seen in the exploded view of FIG. 30) that is inserted in the top of cavity 328, and integral bushing 760 formed at the bottom end of cavity 328 (FIG. 41). The cavity 330 serves for accommodating the seat post 226 (FIG. 30), e.g. by means of a quick-release mechanism and facilitating adjustment of the saddle elevation, bearing at its upper end the saddle 224. Parallel well webs 311B interconnect the front inside walls 300BA and 302BA.

The cavities 328 and 330, as well as the ribs 311B are aligned along the corresponding directions Z5, Z2, and Z6, respectively, thus enabling easy introduction and withdrawal of corresponding molding cores along these directions.

At a lower portion of the frame structure 212, there is provided a crank support 342 integrally molded with the frame members 300 and 302 (as seen for example in FIG. 35) and supporting the crank assembly 240, indirectly through intermediary ring 243, which prevents direct contact between the metal crank assembly 240 and the softer material of the frame structure 212. The crank support 342 comprises recesses 346 one of which defines sprocket chamber 346A (FIG. 50), and at the assembled configuration of the bicycle 210, partially accommodates the front gear in from of pedal sprocket 244 (see for example FIGS. 35 and 43) without limiting its free rotation about the crank assembly 240. The area of the recesses 346 and crank support 342 as well as the outside walls 300A and 302A can be formed by mold cores at least one of which is movable along the axis Z4.

Rear portions 300C and 302C of the first frame member 300 and the second frame member 302, respectively, accommodate the rear wheel 230 and the associated gear assembly mounted thereon as seen, for example, in FIGS. 27, 30 and 44 to 46.

Figure 44:
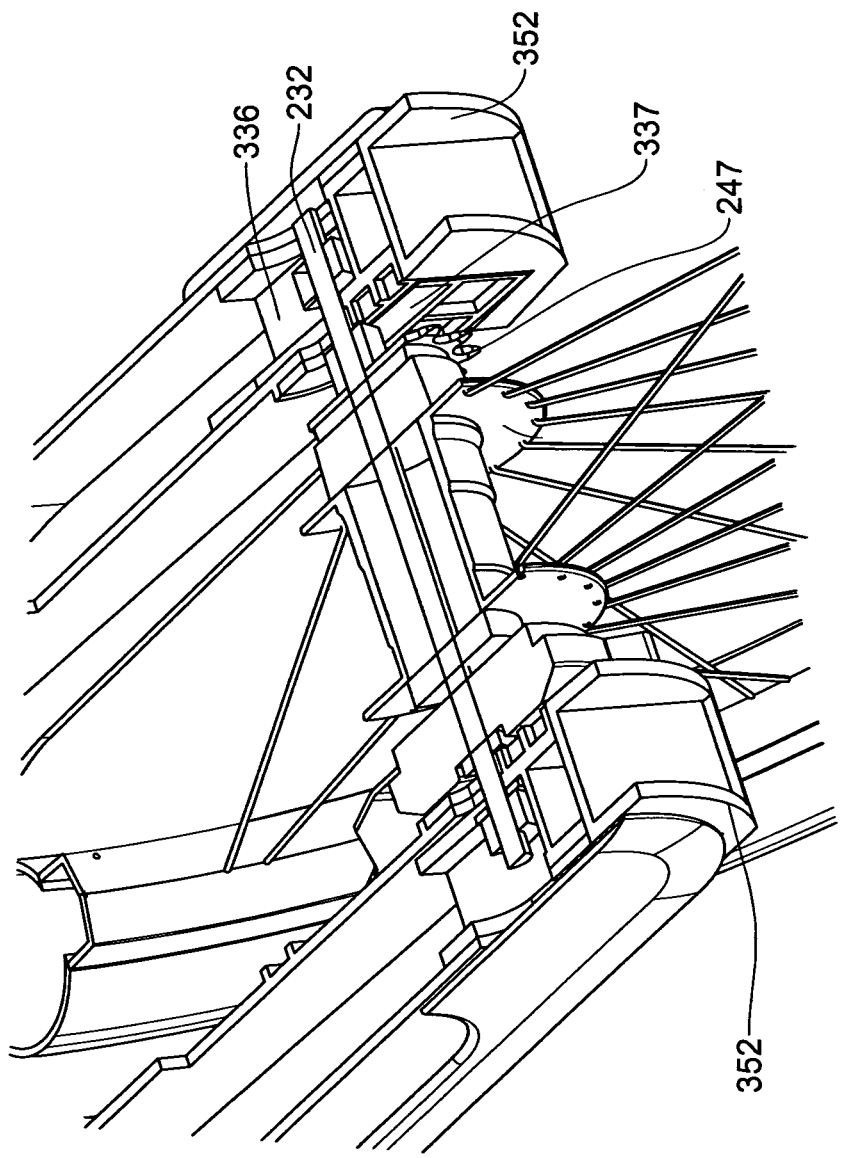
FIG. 44 is a section perspective view of the rear axle and frame with its rear inserts, and without the chain of the bicycle.
Figure 45:
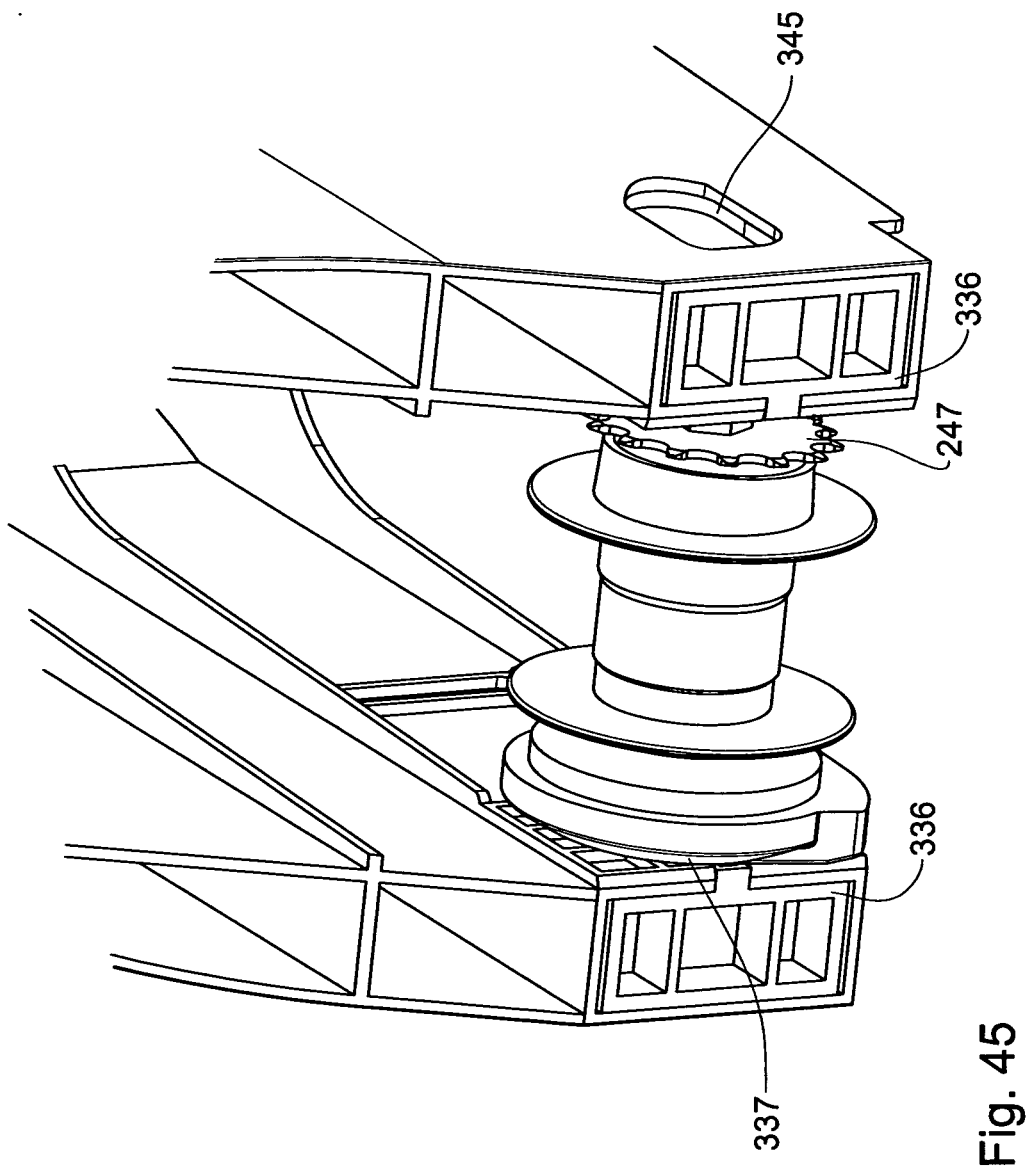
FIG. 45 is a perspective view of the rear axle and frame, and without the rear wheel and the chain of the bicycle.
Figure 46:
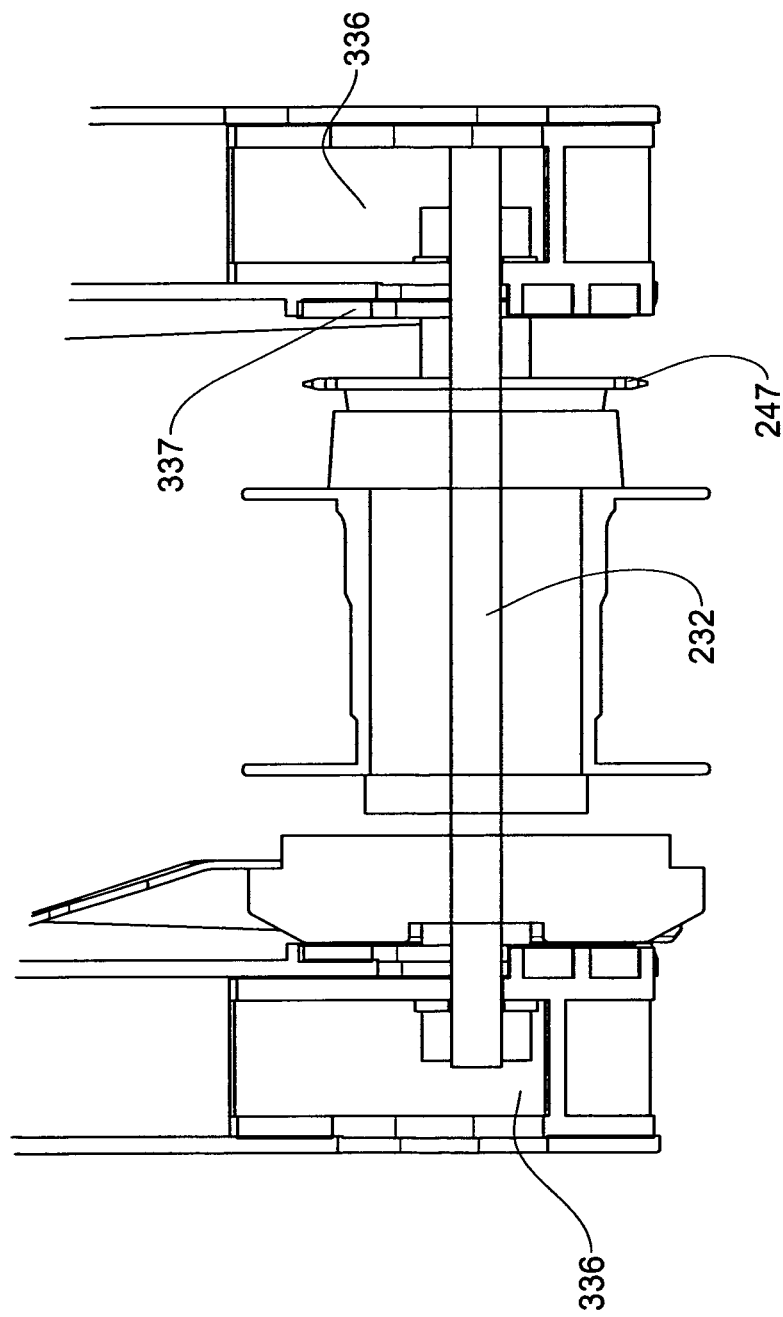
FIG. 46 is a top section view of the rear axle and frame with its rear inserts, and without the chain of the bicycle.
Figure 47:
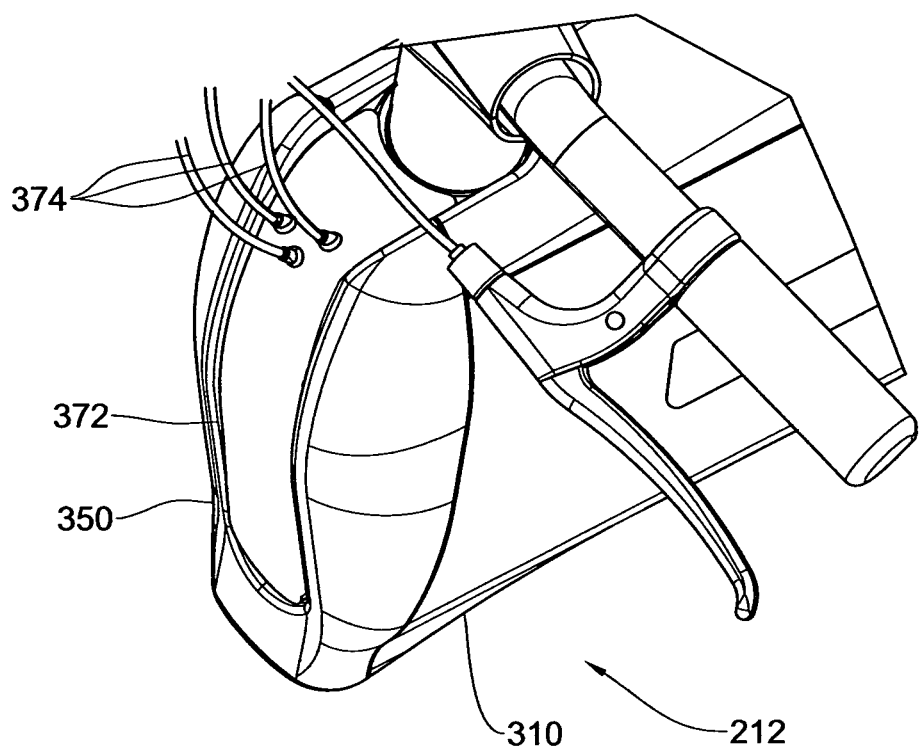
FIG. 47 is a front perspective view of the frame.

As can be seen in FIGS. 44 to 46, behind rear plugs 352 and inside rear portions 300C and 302C of the frame members 300 and 302, there are inserts 336 which are slidingly insertable into the frame members 300 and 302. Edges of the rear axle 232 penetrate the inserts 336 and are secured thereto by nuts. Metal inserts 337 protect the inserts 336 from transverse forces thereupon caused by the rear axle 232, and from direct contact with the rear gear in from of wheel sprocket 247, drive belt in form of chain 246 and other bicycle parts mounted to or on the rear axle 232. As would be apparent to those skilled in the art, the above configuration can be further combined, e.g., with a derailleur, if the bicycle is configured with more than one rear cog (i.e. wheel sprocket 247), and/or an idler pulley.

As seen, for example in FIGS. 30 and 43 to 48, the frame structure 212 is formed with all necessary receptacles and apertures for receiving a plurality of articulating elements, coupling mechanisms, bushings, axles and the like. For example, openings 345 provide access to the rear axle 232.

Figure 48:
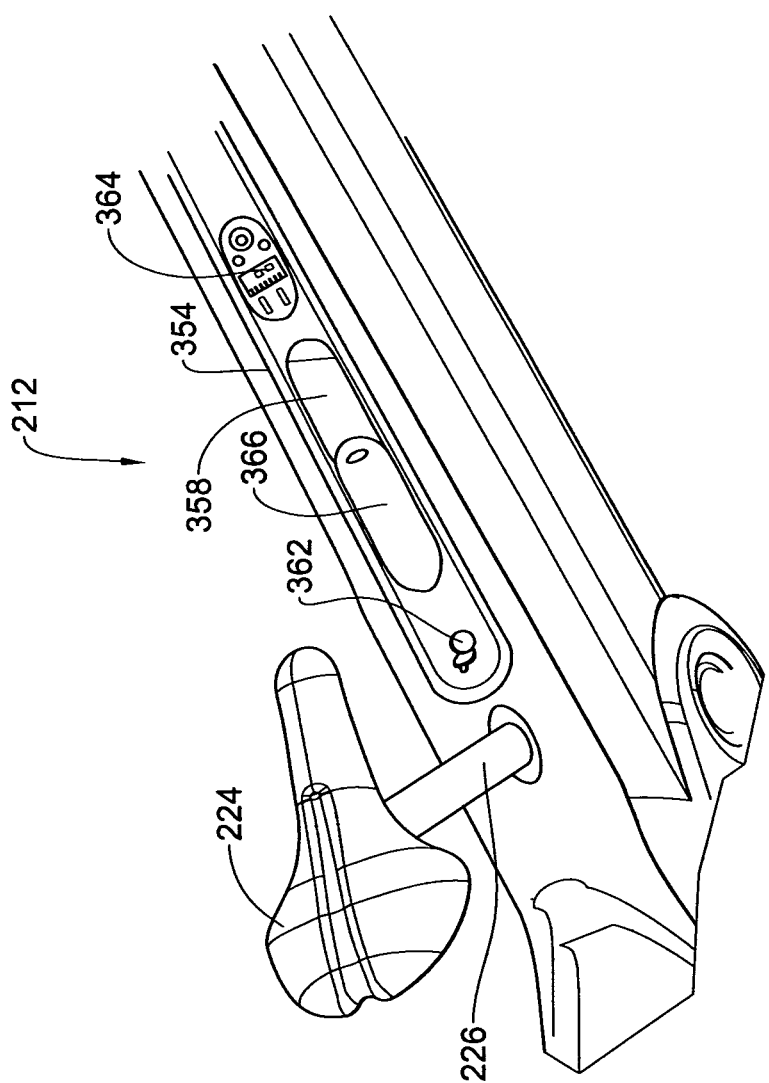
FIG. 48 is a top perspective view of the frame.
Figure 49:
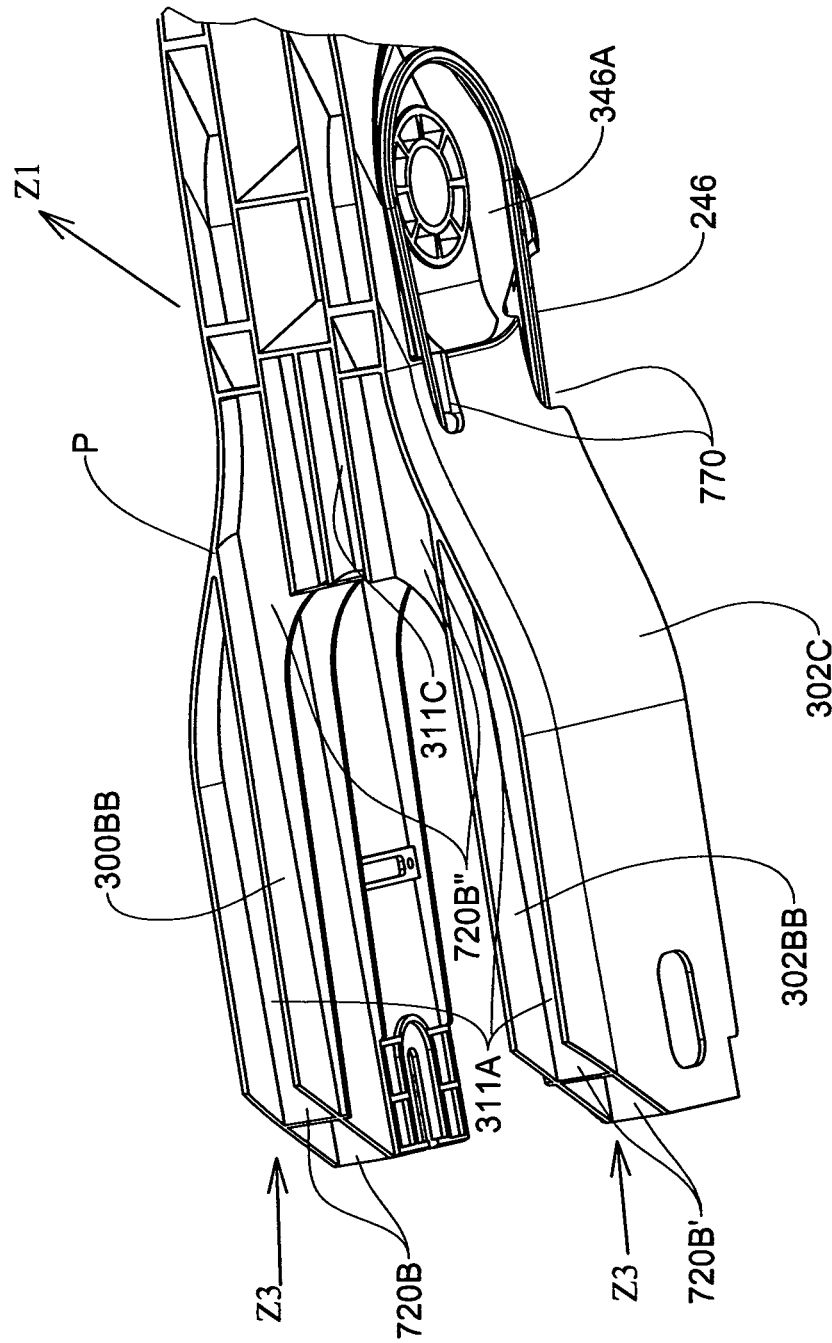
FIG. 49 is perspective view of a portion of the frame, sectioned along XXII-XXII in FIG. 41.
Figure 50:
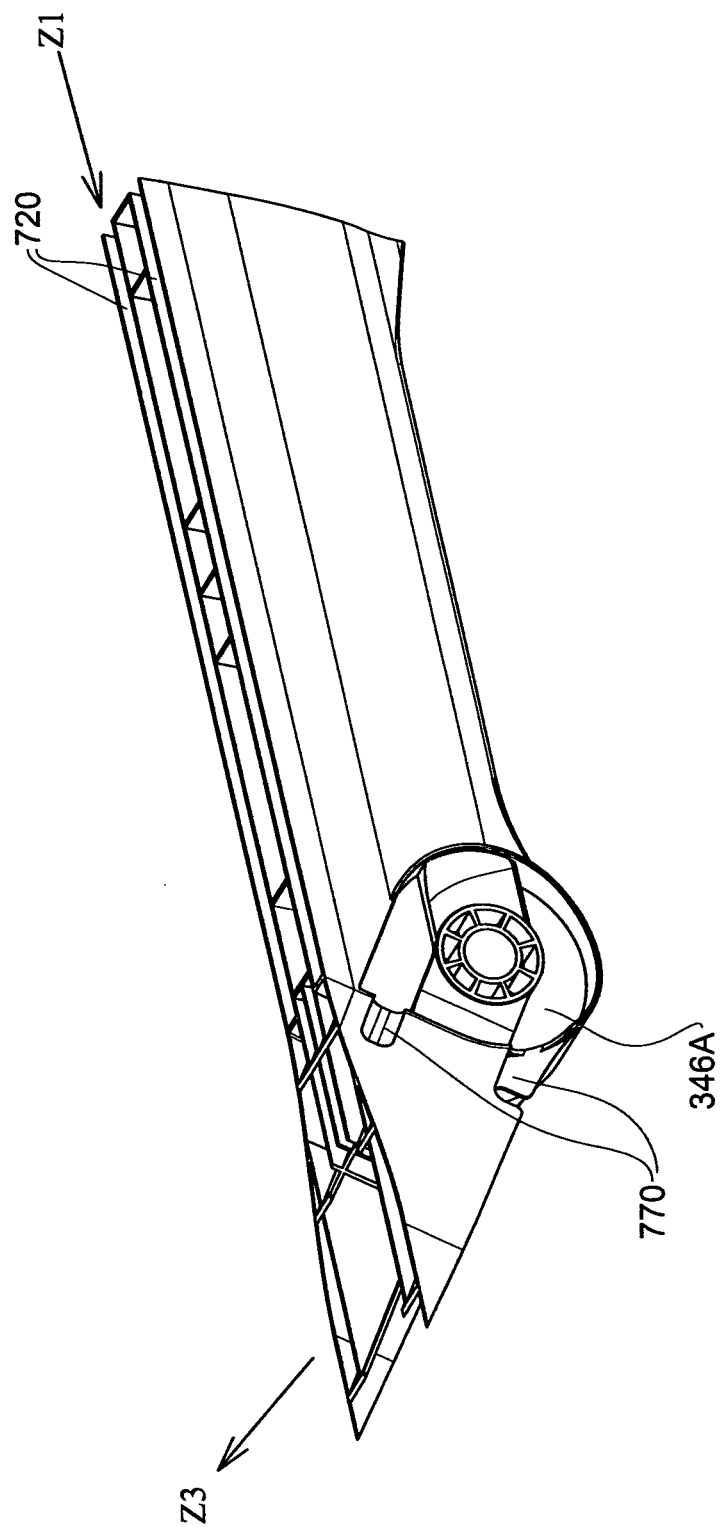
FIG. 50 is perspective view of a portion of the frame, sectioned along XXIII-XXIII in FIG. 41.

The top panel 354 fits onto the body 310 and contains several interfaces, as seen in FIG. 48, including a battery interface 362 and a control panel interface 364, etc. Lid 366 provides access to a storage pouch 368 formed in at least the top panel 354 of the frame structure 212. The storage pouch can be used for general storage, including bicycle maintenance articles such as oil, tools, etc. Components, such as for example a battery, can be provided underneath the top panel 354 and/or in the inner space 304 of the frame structure 212. In alternative variations of this embodiment, one or more of the top panel, interfaces, lid, pouch etc may be omitted.

As appreciated from the drawings, (e.g. FIGS. 43 to 46 and others) the transmission assembly comprised of the pedal sprocket 244, chain 246 and rear transmission gear, i.e., wheel sprocket 247 (one or more such gears may be provided, as known in the art) is all received in the frame structure 212. In particular, the pedal sprocket 244 and most of the chain 246 are accommodated between the frame members 300 and 302, and the remaining portion of the chain 246 and the wheel sprocket 247 are covered by one of the side panels 356, in an eye pleasing and safe manner. In particular, referring to FIGS. 43 and 50, the aft portion 302C comprises openings 770 that allow the chain 246 to pass between the sprocket chamber 346A and the aft space 304C to the wheel sprocket 247.

Furthermore, the arrangement is such that the bicycle composed of a frame structure 212 as disclosed herein, may be easily assembled and knocked down, with the entire assembly being substantially light weight, owing to the light weight of the frame structure 212 and its components. Access to most parts of the bicycle is enabled through the various openings in the frame structure 212, without requiring full disassembly thereof.

In alternative variations of this embodiment, the steering arrangement 400 may be permanently mounted to the frame structure, and the bicycle is configured as an exercise, which is fixed to the ground when in use.

In alternative variations of this embodiment, the frame structure 212 is provided as a stand-alone unit, which can sold separately as a spare part, or which can be assembled with steering structure 400, bicycle seating structure 500, rear wheel 230 and propelling system 600 to provide the bicycle 210.

In alternative variations of this embodiment, the frame structure may comprise a body having one or more sets of channels, each such set comprising a plurality of rectilinear elongate channels parallel to a corresponding direction or axis with respect to the frame structure.

In alternative variations of this embodiment, the inner space 304 may serve for accommodating an electric motor, a power source (battery) and gearing unit for gear engagement with the front gear 244 thus converting the bicycle into a moped. Such an arrangement may be modular, namely the electric motor with its respective power unit, gear coupling and control assembly may be added at any time.

In alternative variations of this embodiment, a dynamo may be connected to the front or rear wheels for rotation therewith, and connected to the battery for recharging the same.

The top panel 354, optionally, can be easily replaced by a plurality of modular elements such as a basket, canopy, mud guard, child seat, tail light, bottle holder, etc. Likewise, the front panel 350, as can be seen for example in FIG. 48, may optionally be formed in different patterns, for example configured also for supporting a front basket, headlights 372, break cables 374, etc. The frame and/or parts thereof can be made of one or a combination of plastic, nylon (e.g. Grilamid—registered trademark), metal, etc. as would be apparent to those of average skill in the art.

While the above disclosure has been directed to a bicycle, it will be appreciated that it applies, mutatis mutandis, to other types of vehicles, such as tricycles, mopeds, motorbikes and so on.

Those skilled in the art to which this invention pertains will readily appreciate that numerous changes, variations, and modifications can be made without departing from the scope of the invention, mutatis mutandis.

The invention claimed is:

1. A frame structure, comprising:
   a top, a bottom, a front end and a rear end,
   a first frame side element and a second frame side element, wherein said first frame side element and said second frame side element are in juxtaposed spaced relationship via a plurality of frame spacer elements and define an inner space between said first frame side element and second frame side element, each one of said first frame side element and second frame side element being a double walled panel,
   a forward portion joined to an aft portion at a transition station, and wherein each one of said first frame side element and said second frame side element comprises a respective forward panel portion joined to a respective aft panel portion at said transition station and wherein for each one of said first frame side element and said second frame side element, the respective forward panel portion comprises a first plurality of panel webs aligned in a first direction, and the respective aft panel portion comprises a second plurality of panel webs aligned in a second direction different from said first direction.

2. The frame structure according to claim 1, wherein the respective forward panel portion of said first frame side element is joined to the respective forward panel portion of said second frame side element along at least a major part of the forward panel portions of the first frame side element and the second frame side element in said first direction via a first set of said frame spacer elements, and wherein said aft panel portion of said first frame side element is separated from said aft panel portion of said second frame side element along at least a major part of said aft panel portions in said second direction from an aft end by an aft space.

3. The frame structure according to claim 2, wherein said aft panel portion of said first frame side element is joined to said aft panel portion of the second frame side element along a part of the aft panel portions in proximity to the transition station via a second set of the frame spacer elements.

4. The frame structure according to claim 3, wherein said frame spacer elements of said second set of frame spacer elements are in the form of second spacer webs joined to a respective inner space-facing panel wall of the respective aft panel portions of said first and second frame side elements, wherein at least one of said second spacer webs is substantially aligned with said second direction.

5. The frame structure according to claim 2, wherein said frame spacer elements of said first set of frame spacer elements are in the form of first spacer webs joined to inner space-facing panel walls of the respective forward panel portions of said first and second frame side elements.

6. The frame structure according to claim 5, wherein at least one of said first spacer webs is aligned in a third direction, different from said first direction and said second direction.

7. The frame structure according to claim 1, wherein a first mounting structure is provided in said inner space and comprises a pair of spaced bearings mounted in a first well comprised in said inner space, said bearings being configured for enabling a pivot shaft of a bicycle steering structure to be rotatably mounted thereto for selectively pivoting the bicycle steering structure with respect to said frame structure.

8. The frame structure according to claim 7, wherein said first well comprises a pair of spaced first well webs formed in said inner space and joined to inner space-facing panel walls of the respective forward panel portions of said first and second frame side elements.

9. The frame structure according to claim 8, wherein said first well webs are parallel and aligned in another direction, different from said first direction and said second direction.

10. The frame structure according to claim 8, wherein said first well webs are parallel and aligned in a direction substantially orthogonal to said first direction.

11. The frame structure according to claim 1, further comprising an aft space defining a rear wheel well therebetween, and wherein said aft panel portion of said first frame side element and said aft panel portion of said second frame side element each comprise a rear wheel mounting arrangement.

12. The frame structure according to claim 11, wherein the frame structure further comprises a rear wheel rotatably mounted to said rear wheel mounting arrangement.

13. The frame structure according to claim 1,
   wherein the top, bottom, front end, rear end, first frame side element and second frame side element, are configured as a unitary and integral structure.

* * * * *